US009008621B2

(12) United States Patent
Kataoka et al.

(10) Patent No.: US 9,008,621 B2
(45) Date of Patent: Apr. 14, 2015

(54) COMMUNICATION SERVER, MOBILE COMMUNICATION TERMINAL, COMMUNICATION METHOD, AND COMPUTER PRODUCT

(75) Inventors: Masahiro Kataoka, Kawasaki (JP); Ken Hayashida, Kawasaki (JP); Masahiko Shimada, Kawasaki (JP); Takashi Tsubokura, Setagaya (JP)

(73) Assignee: Fujitsu Limited, Kawasaki (JP)

( * ) Notice: Subject to any disclaimer, the term of this patent is extended or adjusted under 35 U.S.C. 154(b) by 237 days.

(21) Appl. No.: 12/335,322
(22) Filed: Dec. 15, 2008
(65) Prior Publication Data
US 2009/0093244 A1   Apr. 9, 2009

Related U.S. Application Data

(63) Continuation of application No. PCT/JP2006/312661, filed on Jun. 23, 2006.

(51) Int. Cl.
H04M 1/66 (2006.01)
G06F 15/16 (2006.01)
H04M 1/68 (2006.01) H04M 3/16
(2006.01) G06F 21/10
(2013.01) H04W 12/02
(2009.01)

(52) U.S. Cl.
CPC .............. G06F 21/10 (2013.01); H04W 12/02 (2013.01)

(58) Field of Classification Search
CPC ................. H04L 63/0428–63/045; H04B 1/66
USPC ................ 455/410, 411, 412.1, 414.1, 414.2, 455/414.3, 414.4, 418; 375/240.25; 713/150, 156, 155; 380/217, 269; 709/247; 382/232–253
See application file for complete search history.

(56) References Cited

U.S. PATENT DOCUMENTS

| 6,286,008 B1* | 9/2001 | Matsumoto et al. ................... 1/1 |
| 6,670,897 B1* | 12/2003 | Lin ................. 341/65 |
| 7,523,112 B2* | 4/2009 | Hassan et al. .......................... 1/1 |
| 2005/0172154 A1* | 8/2005 | Short et al. .................... 713/201 |
| 2005/0226515 A1* | 10/2005 | Endo et al. ..................... 382/243 |
| 2005/0226516 A1* | 10/2005 | Kimura et al. ................ 382/243 |
| 2005/0273399 A1* | 12/2005 | Soma et al. ...................... 705/26 |
| 2006/0153542 A1* | 7/2006 | Chun et al. ..................... 386/125 |

FOREIGN PATENT DOCUMENTS

| JP | 11-039262 | 2/1999 |
| JP | A 2002-99832 | 4/2002 |
| JP | 2002-287628 | 10/2002 |
| JP | 2003-303137 | 10/2003 |
| JP | A 2004-48540 | 2/2004 |
| JP | 2005-149437 | 6/2005 |
| JP | A 2005-242834 | 9/2005 |
| JP | A 2006-18402 | 1/2006 |
| JP | A 2006-121689 | 5/2006 |
| WO | WO 2006/123448 A1 | 11/2006 |

OTHER PUBLICATIONS

Notice of Rejection mailed Nov. 16, 2010, in Japanese Application No. 2008-522222.

* cited by examiner

Primary Examiner — Gerald Johnson
Assistant Examiner — Christopher Kohlman
(74) Attorney, Agent, or Firm — Greer Burns & Crain, Ltd.

(57) ABSTRACT

A method of controlling decompression, wherein the method includes: transmitting, by a first computer that already has stored therein compressed data that are compressed based on compression parameters, identification information for identifying the first computer to a second computer that stores therein the compression parameters; and encrypting, by the second computer, the compression parameters using the identification information received from the first computer. The compression parameters include at least a frequency of appearance and an allocated sign for each piece of character data. The method also includes: transmitting, by the second computer, the encrypted compression parameters to the first computer; decrypting, by the first computer, the encrypted compression parameters received from the second computer using the identification information; and decompressing, by the first computer, the compressed data based on the decrypted compression parameters.

10 Claims, 25 Drawing Sheets

FIG.7

| CATEGORY | CHARACTER DATA | FREQUENCY OF APPEARANCE | ALLO-CATED SIGN |
|---|---|---|---|
| SINGLE-BYTE CHARACTER (CHARACTER TYPE: FIXED TO 256) | OO (FIRST CHARACTER) | ... | ... |
| | ⋮ | ⋮ | ⋮ |
| | FF (LAST CHARACTER) | ... | ... |
| DOUBLE-BYTE CHARACTER (CHARACTER TYPE: UP TO 2048) | (MOST FREQUENTLY APPEARING CHARACTER) | ... | ... |
| | ⋮ | ⋮ | ⋮ |
| | (2048TH APPEARING CHARACTER) | ... | ... |
| CONSECUTIVE HIRAGANA CHARACTERS (CHARACTER TYPE: UP TO 2061) | ああ (FIRST CHARACTER) | ... | ... |
| | ⋮ | ⋮ | ⋮ |
| | んん (LAST CHARACTER) | ... | ... |
| CONSECUTIVE FULL-SIZE KATAKANA CHARACTERS (CHARACTER TYPE: UP TO 2061) | アア (FIRST CHARACTER) | ... | ... |
| | ⋮ | ⋮ | ⋮ |
| | ンン (LAST CHARACTER) | ... | ... |
| CONSECUTIVE HALF-SIZE KATAKANA CHARACTERS (CHARACTER TYPE: UP TO 64) | ｱｱ (FIRST CHARACTER) | ... | ... |
| | ⋮ | ⋮ | ⋮ |
| | ｿﾝ (LAST CHARACTER) | ... | ... |
| CONSECUTIVE FULL-SIZE UPPER CASE ALPHABETIC CHARACTERS (CHARACTER TYPE: UP TO 64) | Ａ Ａ (FIRST CHARACTER) | ... | ... |
| | ⋮ | ⋮ | ⋮ |
| | Ｚ Ｚ (LAST CHARACTER) | ... | ... |
| CONSECUTIVE HALF-SIZE UPPER CASE ALPHABETIC CHARACTERS (CHARACTER TYPE: UP TO 64) | AA (FIRST CHARACTER) | ... | ... |
| | ⋮ | ⋮ | ⋮ |
| | ZZ (LAST CHARACTER) | ... | ... |
| CONSECUTIVE FULL-SIZE LOWER CASE ALPHABETIC CHARACTERS (CHARACTER TYPE: UP TO 128) | ａ ａ (FIRST CHARACTER) | ... | ... |
| | ⋮ | ⋮ | ⋮ |
| | ｚ ｚ (LAST CHARACTER) | ... | ... |
| CONSECUTIVE HALF-SIZE LOWER CASE ALPHABETIC CHARACTERS (CHARACTER TYPE: UP TO 256) | aa (FIRST CHARACTER) | ... | ... |
| | ⋮ | ⋮ | ⋮ |
| | zz (LAST CHARACTER) | ... | ... |
| CONSECUTIVE FULL-SIZE NUMERIC CHARACTERS (CHARACTER TYPE: UP TO 100) | ０ ０ (FIRST CHARACTER) | ... | ... |
| | ⋮ | ⋮ | ⋮ |
| | ９ ９ (LAST CHARACTER) | ... | ... |
| CONSECUTIVE HALF-SIZE NUMERIC CHARACTERS (CHARACTER TYPE: 100) | 00 (FIRST CHARACTER) | ... | ... |
| | ⋮ | ⋮ | ⋮ |
| | 99 (LAST CHARACTER) | ... | ... |
| RESERVED WORD (TYPE: UP TO 256) | <img src='..¥gaiji¥g>(FIRST RESERVED WORD) | ... | ... |
| | ⋮ | ⋮ | ⋮ |
| | </strong>(LAST RESERVED WORD) | ... | ... |

COMMUNICATION SERVER, MOBILE COMMUNICATION TERMINAL, COMMUNICATION METHOD, AND COMPUTER PRODUCT

This application is a Continuation of International Application Serial No. PCT/JP2006/312661, filed Jun. 23, 2006.

BACKGROUND OF THE INVENTION

1. Field of the Invention

The present invention relates to communication for the installation of large-volume content into non-broadband communication devices such as mobile telephones and personal digital assistants (PDAs).

2. Description of the Related Art

Conventionally, installation and authentication pose a problem for large-volume dictionaries and e-learning content of mobile devices such as mobile telephones and PDAs. Conventional authentication technology includes an established scheme, described below, for encrypting content by using information unique to a device as a key. However, as dictionaries such as Kojien have a large volume of 130 MB (main bodies and index), the scheme cannot be put into practical use.

Establishment of a technology to indirectly use personal computers (PCs) for the authentication and installation of dictionary content to mini-SD cards or hard discs (HDs) of mobile telephones, PDAs, etc. via compact disc read-only memory (CD-ROM) or broadband communication is necessary.

Conventional installation/authentication schemes include, for example, a scheme disclosed in Japanese Patent Application Laid-Open Publication No. 2002-099832, whereby a content distribution server adds copy protection information using the mobile telephone number of a request source as a key to allow only the request-source mobile telephone to use the content.

However, with such schemes, a problem arises in that the content becomes unusable if the mobile telephone is switched to another mobile telephone. Consequently, Japanese Patent Application Laid-Open Publication No. 2004-048540 discloses a scheme where content is encrypted using information unique to the terminal apparatus requesting the content as a key such that the content cannot be decrypted in other terminals.

Meanwhile, although small to medium-size dictionary content may be downloaded and sold according to some schemes, problems arise in terms of capacity, time, communication costs, and authentication. Such downloading (installation) schemes include two types, a full-downloading scheme and a server-and-browser scheme.

The full-downloading scheme is a scheme of downloading (installing) all the content files, block data, and a program for retrieving/reproducing the data in a client system. On the other hand, the server-and-browser scheme is a scheme of using a client browser to retrieve/reproduce data in a server without downloading (installing) the data such as files.

The conventional technology disclosed in Japanese Patent Application Laid-Open Publication No. 2004-048540 is highly effective in preventing unauthorized use since no unique information is added to content and hence, the content is encrypted in its entirety. However, as the text and index data of the fifth edition of Kojien has a volume of approximately 130 MB, the technology is impractical for such large-volume dictionary content with respect to mobile telephones, as described below.

It takes a few hours or more to download the large-capacity dictionary content through non-broadband (narrowband), which poses a problem of practicality. Such download may incur high packet charges of few thousand yen or more, or for some content, several hundred thousand yen, further posing a problem of practicality.

Schemes enabling the download (installation) and sale of small to medium-size dictionary content (the full-downloading mode and the server-and-browser mode) require a large amount of download (install) time for large-volume dictionary content, posing a problem of practicality. Such download may incur high packet charges such of a few thousand yen or more, or for some content, several hundred thousand yen, again posing a problem of practicality. Further, as mobile telephones need a large capacity storage medium under such schemes, a problem of increased mobile telephone cost arises.

SUMMARY OF THE INVENTION

It is an object of the present invention to at least solve the above problems in the conventional technologies.

A computer-readable recording medium according to one aspect of an embodiment stores therein a communication program causing a computer to execute: transmitting, from a mobile communication terminal to a communication server, terminal identification information unique to the mobile communication terminal, where the mobile communication terminal stores related data including representative keywords correlated to files of content compressed according to compression parameters and further stores information installed from the files, and the communication server stores therein the compression parameters capable of decompressing the files; receiving, from the communication server, the compression parameters encrypted using the terminal identification information transmitted at the transmitting; decrypting, using the terminal identification information, the compression parameters received at the receiving the compression parameters; receiving input of an arbitrary search keyword; searching the related data for a representative keyword matching or related to the arbitrary search keyword; determining, based on the information installed from the files, whether a file compressed and correlated with a search result retrieved at the searching is stored in the mobile communication terminal; decompressing, based on a determination result at the determining and using the compression parameters, the file correlated with the search result; and displaying, on a display screen, information related to the search result and read from the file decompressed at the decompressing.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a schematic of compression parameters;

DETAILED DESCRIPTION OF THE PREFERRED EMBODIMENTS

Referring to the accompanying drawings, exemplary embodiments according to the present invention are explained in detail below.

Figure 1:
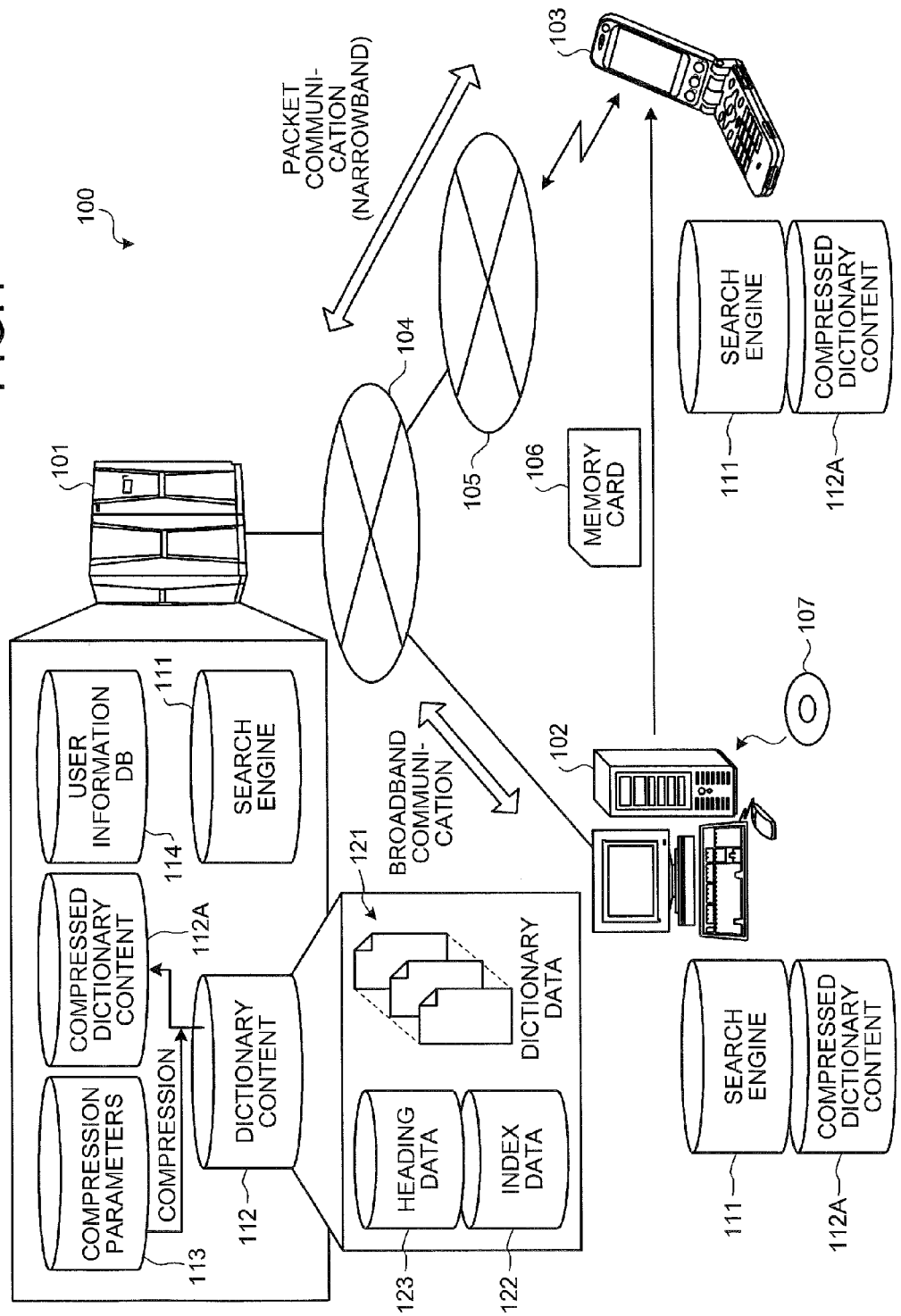
FIG. 1 is a view of a system configuration of a communication system according to an embodiment of the present invention.

FIG. 1 is a view of a system configuration of a communication system according to an embodiment of the present invention. A communication system 100 depicted in FIG. 1, enables broadband communication between a communication server 101 and a PC 102 in an internet network 104 through Asymmetric Digital Subscriber Lines (ADSL) or optical fibers.

Packet communication (narrowband) is enabled between the communication server 101 and a mobile communication terminal 103 such as a mobile telephone and a PDA in a mobile telephone network 105. The mobile telephone network 105 is provided with a gateway (not depicted) and executes protocol conversion of data sent from the internet network 104 to transmit the data to the mobile communication terminal 103.

The communication server 101 is a computer apparatus that manages a search engine 111, dictionary content 112, compression parameters 113, compressed dictionary content 112A, and a user information DB 114 and uses the user information DB 114 to authenticate the mobile communication terminal 103. Although the communication server 101 is represented as one server in FIG. 1, the communication server 101 may include plural servers.

For example, a server of a company creating the dictionary content 112 may manage the dictionary content 112 and the compressed dictionary content 112A, and a server of a mobile telephone service provider may perform the authentication and the management of the search engine 111, the compression parameters 113, and the user information DB 114.

The dictionary content 112 is electronic data searched for by the mobile communication terminal 103 and may be the contents of a dictionary such as a Japanese language dictionary, an English-Japanese dictionary, a Japanese-English dictionary, and a terminology dictionary. The dictionary content 112 includes dictionary data 121, index data 122, and headword data 123.

The dictionary data 121 are data including descriptions of headwords and explanation texts, and for example, are made up of plural main-body hyper text markup language (HTML) files. The index data 122 are data indexing headwords and having an index configuration in the electronic publishing format EPWING according to Japanese Industrial Standard JIS-X4081. The heading data 123 are data correlating the index data 122 with the dictionary data 121 through representative keywords such as headwords.

The compression parameters 113 are data for compressing the dictionary content 112 and include a frequency of appearance (number of times or probability) and an allocated sign for each piece of character data. The compressed dictionary content 112A is data compressed using the compression parameters 113. Preferably at least the dictionary data 121 are compressed, and the heading data 123 and the index data 122 may or may not be compressed.

Having a large volume, the compressed dictionary content 112A is not downloaded to the mobile communication terminal 103, although download to the PC 102 through the internet network 104 is possible. The search engine 111 is software having a function of downloading the compression parameters 113 and the search engine 111 from the communication server 101 to the mobile communication terminal 103 and a search function for the dictionary content 112.

The PC 102 is a computer apparatus possessed by a user and may download various data from the communication server 101 through the internet network 104 (broadband). The downloaded compressed dictionary content 112A is stored in a memory card 106 and can be migrated to the mobile communication terminal 103.

The memory card 106 is a semiconductor memory that may have large volume of data stored thereon and is connectable directly or indirectly through an adaptor (not depicted) to the PC 102 and the mobile communication terminal 103, thereby enabling delivery and receipt of data between the PC 102 and the mobile communication terminal 103.

Even if the compressed dictionary content 112A is not downloaded from the communication server 101, the compressed dictionary content 112A may be read from an optical disc (e.g., CD-ROM or digital versatile disc (DVD)) having the compressed dictionary content 112A stored thereon and may be migrated to the memory card 106.

The mobile communication terminal 103 is a portable computer terminal, such as a mobile telephone and PDA, possessed by a user and enabling download from the communication server 101 through the mobile telephone network 105 (narrowband). The mobile communication terminal 103 has a large-capacity internal memory such as random access memory (RAM) or an HD therein and may install the compressed dictionary content 112A imported from the memory card 106.

The compressed dictionary content 112A may be installed in the large-capacity internal memory in advance. Since the capacity of the search engine 111 is small, the search engine 111 may be imported to the mobile communication terminal 103 through the same route as the compressed dictionary content 112A as described above or may be preinstalled in the large-capacity internal memory of the mobile communication terminal 103. Alternatively, the search engine 111 may be downloaded from the communication server 101 over the mobile telephone network 105 through the packet communication (narrowband).

Figure 2:
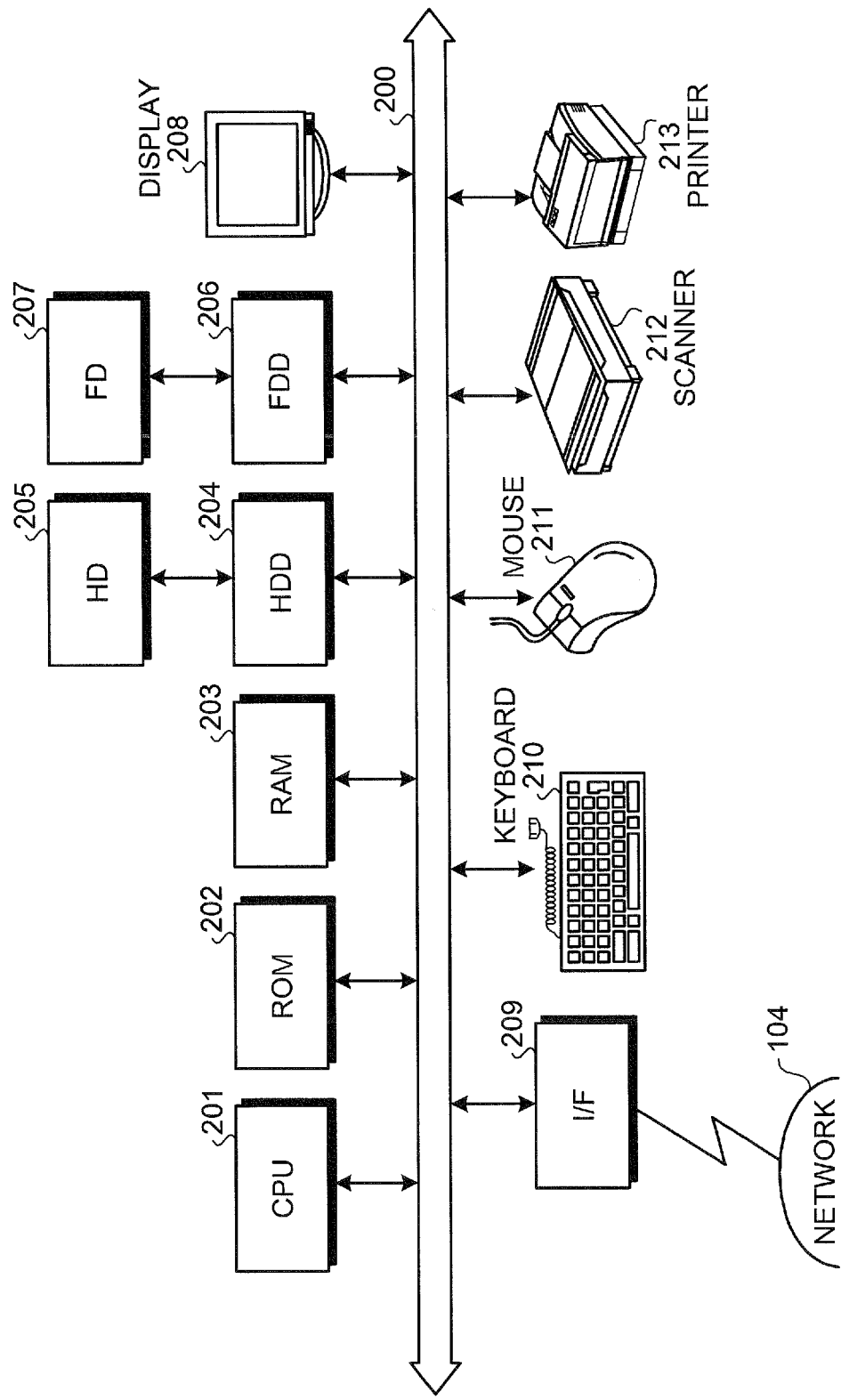
FIG. 2 is a block diagram of a computer apparatus according to the embodiment.

FIG. 2 is a block diagram of a computer apparatus according to the embodiment of the present invention.

As depicted in FIG. 2, the computer apparatus includes a central processing unit (CPU) 201, a read-only memory (ROM) 202, a RAM 203, a hard disc drive (HDD) 204, an HD 205, a flexible disc drive (FDD) 206, a flexible disc (FD) 207 as an example of a removal recording medium, a display 208, an interface (I/F) 209, a keyboard 210, a mouse 211, a scanner 212, and a printer 213. These component units are connected by way of a bus 200.

The CPU 201 governs overall control of the computer apparatus. The ROM 202 stores programs such as a boot program. The RAM 203 is used as a work area of the CPU 201. The HDD 204, under the control of the CPU 201, controls reading/writing of data from/to the HD 205. The HD 205 stores the data written under the control of the HDD 204.

The FDD 206, under the control of the CPU 201, controls reading/writing of data from/to the FD 207. The FD 207 stores the data written under the control of the FDD 206 and the data stored in the FD 207 is read by the computer apparatus.

A removable recording medium may be, besides the FD 207, a CD-ROM, compact disk-recordable (CD-R), a compact disk-rewritable (CD-RW), a magneto optical disk (MO), a DVD, or the memory card 106. The display 208 displays a cursor, an icon, a tool box, and data such as document, image, and function information. The display 208 may be, for example, a cathode ray tube (CRT), a thin-film-transistor (TFT) liquid crystal display, or a plasma display.

The I/F 209 is connected to the internet network 104 and through the internet network 104 is connected to other devices. The I/F 209 serves as an interface between the network 104 and the inside of the apparatus and controls the input and output of data from or to external devices. The I/F 209 may be, for example, a modem or a local area network (LAN) adapter.

The keyboard 210 is equipped with keys for the input of characters, numerals, and various instructions, and data is entered through the keyboard 210. The keyboard 210 may be a touch-panel input pad or a numeric key keypad. The mouse 211 performs cursor movement, range selection, and movement, size change, etc., of a window. The mouse 211 may be a trackball or a joystick provided it has similar functions as a pointing device.

The scanner 212 optically reads an image and takes in the image data into the computer apparatus. The scanner 212 may have an optical character recognition (OCR) function as well. The printer 213 prints image data and document data. The printer 213 may be, for example, a laser printer or an ink jet printer.

Figure 3:
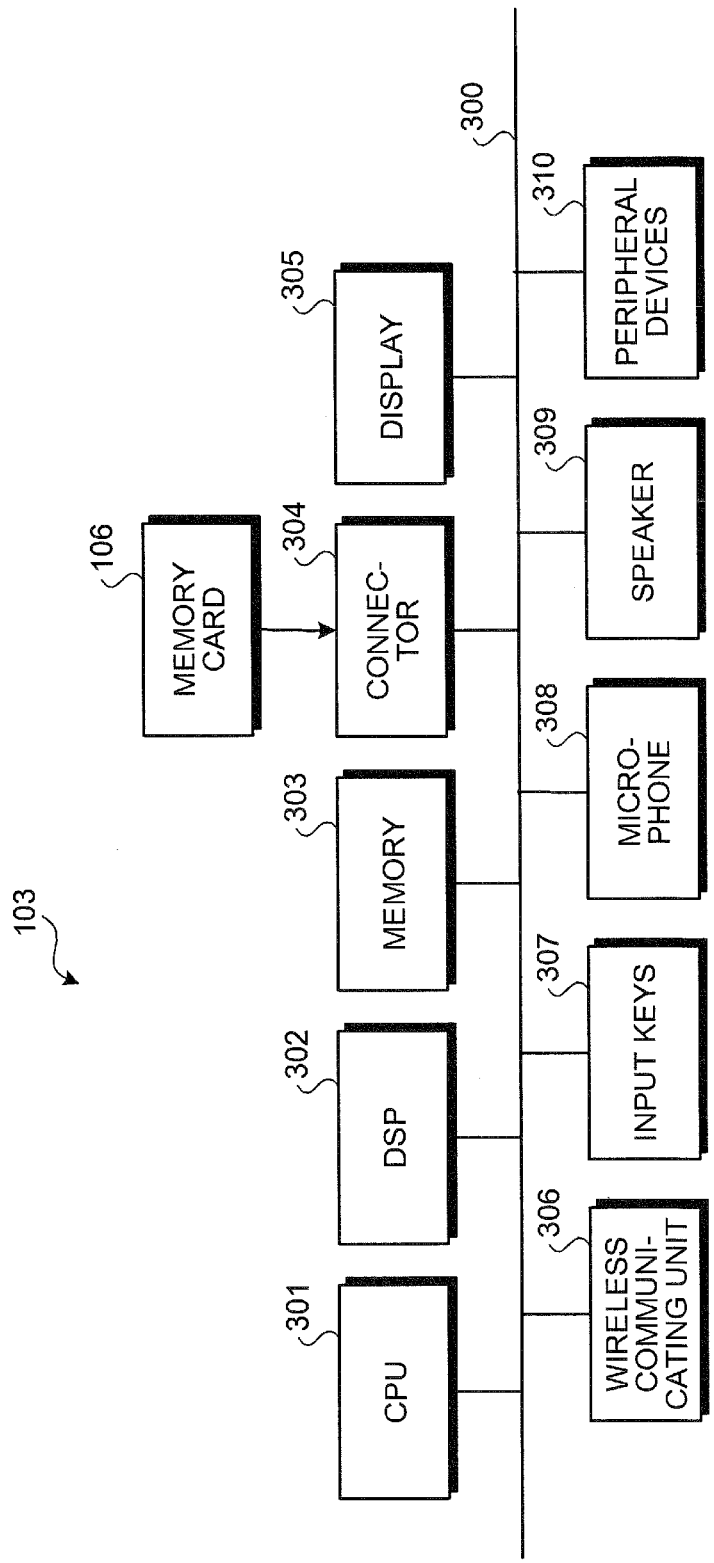
FIG. 3 is a block diagram of a mobile communication terminal depicted in FIG. 1.

FIG. 3 is a block diagram of the mobile communication terminal 103 depicted in FIG. 1. The mobile communication terminal 103 depicted in FIG. 3 includes a CPU 301, a digital signal processor (DSP) 302, a memory 303, a connector 304, a display 305, a wireless communication unit 306, input keys 307, a microphone 308, a speaker 309, and peripheral devices 310. The constituent units are connected to each other through a bus 300.

The CPU 301 governs overall control of the mobile communication terminal 103. The DSP is a dedicated processor for processing digital signals. The memory 303 includes RAM, an HD, etc., and is used as a work area of the CPU 301. The memory 303 stores thereon the compressed dictionary content 112A, the compression parameters 113, the dictionary content 112, and the search engine 111. The connector 304 detachable from the memory card 106 and can migrate data stored on the memory card 106 to the memory 303.

The display 305 displays a cursor, icons or tool boxes as well as data such as documents, images, and function information. The display 305 may be a TFT liquid crystal display and an organic EL display, for example. The wireless communication unit 306 is a communication interface that receives, transmits, modulates, and demodulates radio waves and is communicably connected to another apparatus through the mobile telephone network 105.

The input keys 307 are keys for entering characters, numeric characters, various instructions, etc. A touch-panel type input pad, a numeric keypad, etc., may be adopted. The microphone 308 captures and converts sounds into electrical signals. The speaker 309 converts electrical signals into sounds to be output. The peripheral devices 310 include a camera module, an infrared communicating module, a two-dimensional bar-code reader, a Global Positioning System (GPS) receiver, etc.

Figure 4:
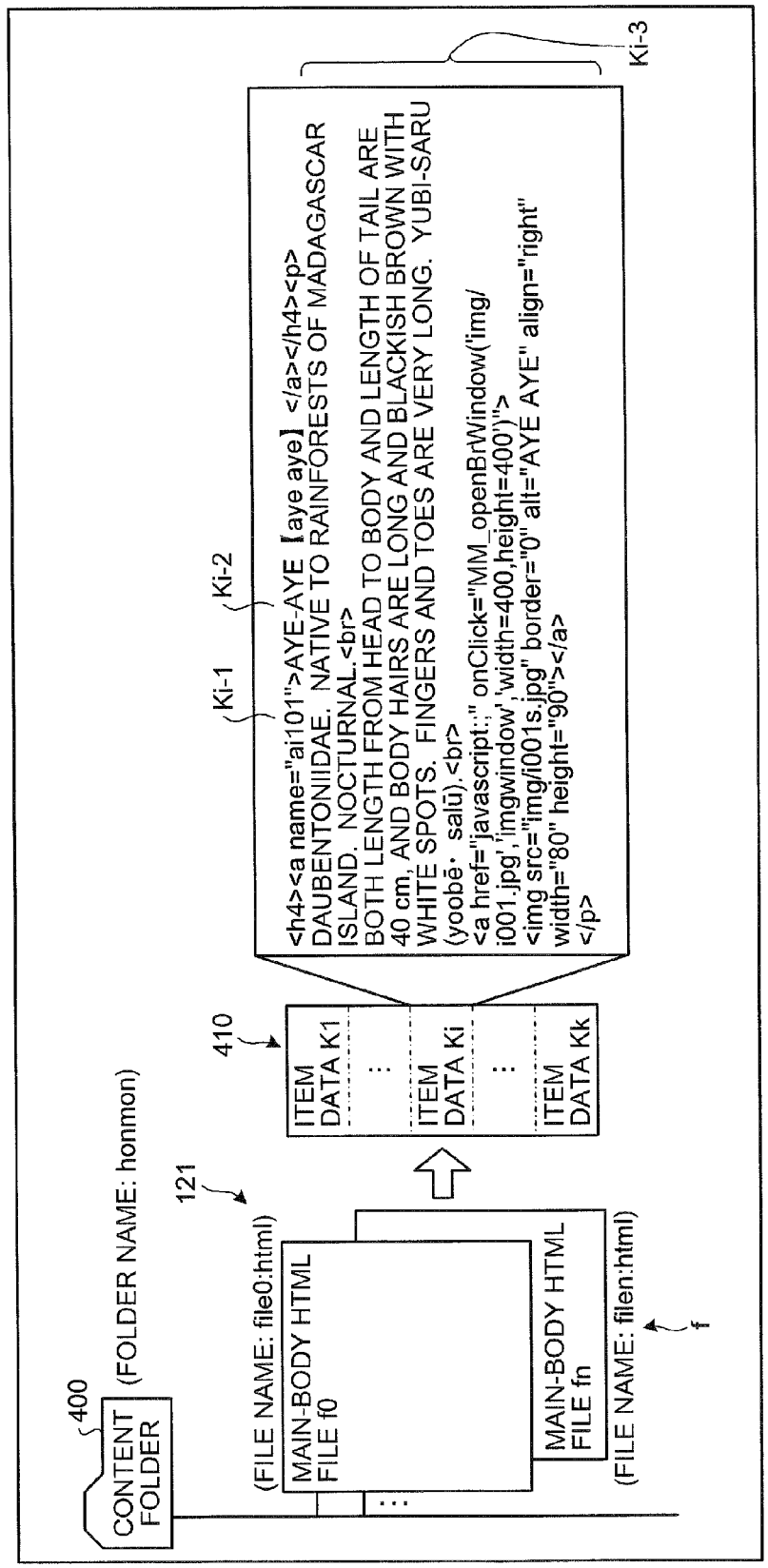
FIG. 4 is a schematic of an example of a configuration of dictionary data included in dictionary content.

FIG. 4 is a schematic of an example of a configuration of the dictionary data 121 in the dictionary content 112.

As depicted in FIG. 4, a content folder 400 (folder name: honmon) stores therein the dictionary data 121 that are main-body HTML files from a first main-body HTML file f0 (file name: file0.html) to a last main-body HTML file fn (file name: filen.html).

The main-body HTML files f0 to fn include descriptions of item data K1 to Kk, each consisting of an anchor, a headword, and explanation text thereof. A main-body HTML list 410 is generated by combining the item data K1 to Kk described in the main-body HTML files f0 to fn.

In the main-body HTML list 410, arbitrary item data Ki are item data described in one of the main-body HTML files. In the item data Ki, an anchor Ki-1 is "ai101", and a headword Ki-2 is "Aye-Aye [aye aye]". A reference numeral Ki-3 denotes explanation text.

Figure 5:
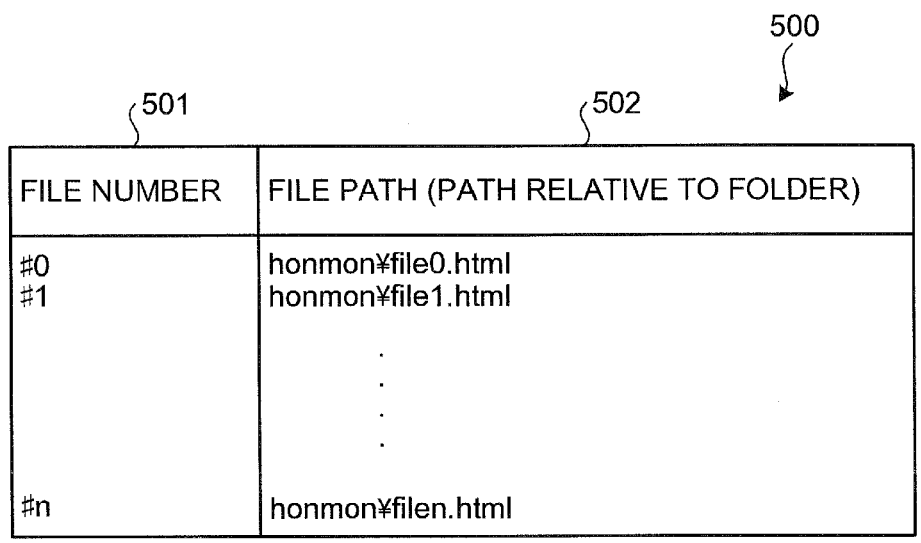
FIG. 5 is a schematic of file configuration data of main-body HTML files.

FIG. 5 is a schematic of file configuration data of the main-body HTML files. As depicted in FIG. 5, file configuration data 500 are data correlating file numbers of the main-body HTML files f0 to fn (reference numeral 501) with file paths of the main-body HTML files f0 to fn (reference numeral 502). The file numbers correspond to numbers appended to the main-body HTML file f and, for example, in the case of the main-body HTML file f0, the file number is "#0".

Since the folder name of the content folder 400 is "honmon" and the file name of the main-body HTML file f0 is "file0.html", a file path of the main-body HTML file f0 having the file number #0 is "honmonfile0.html".

Figure 6:
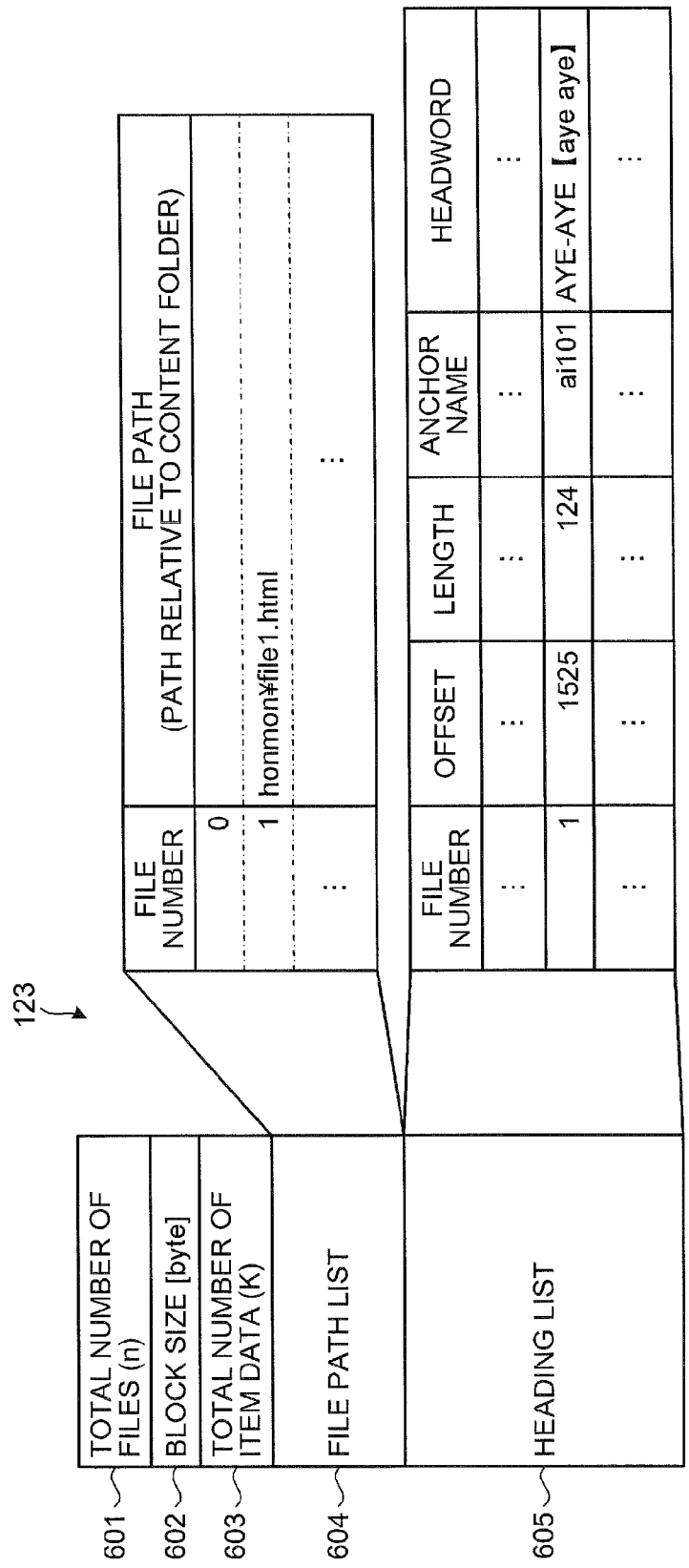
FIG. 6 is a schematic of heading data.

FIG. 6 is a schematic of the heading data 123. As depicted in FIG. 6, the heading data 123 include total file number information (n) 601 of the main-body HTML files, total block size information 602 of the main-body HTML files f0 to fn, total item data number information (K) 603 of the main-body HTML list 410, a file path list 604 of the main-body HTML files f0 to fn, and a heading list 605.

The file path list 604 is a list including descriptions of file numbers and file paths for each of the main-body HTML files f0 to fn. The heading list 605 is a list including descriptions of file numbers, offset values, lengths, anchors (names), and headwords for each of the main-body HTML files f0 to fn. Thus, the heading data 123 are data correlated with the main-body HTML files f0 to fn using headwords as representative keywords.

FIG. 7 is a schematic of the compression parameters 113. As depicted in FIG. 7, the compression parameters 113 include character data classified by categories such as single-byte character, double-byte character, consecutive Hiragana characters, etc., and frequency of appearance in the dictionary content 112 (main-body HTML files) and allocated signs allocated to the character data for each of the character data in the categories are defined. The dictionary content 112 is compressed (Huffman-compressed) according to these allocated signs. Consecutive characters mean a string of two or more consecutive characters.

Figure 8:
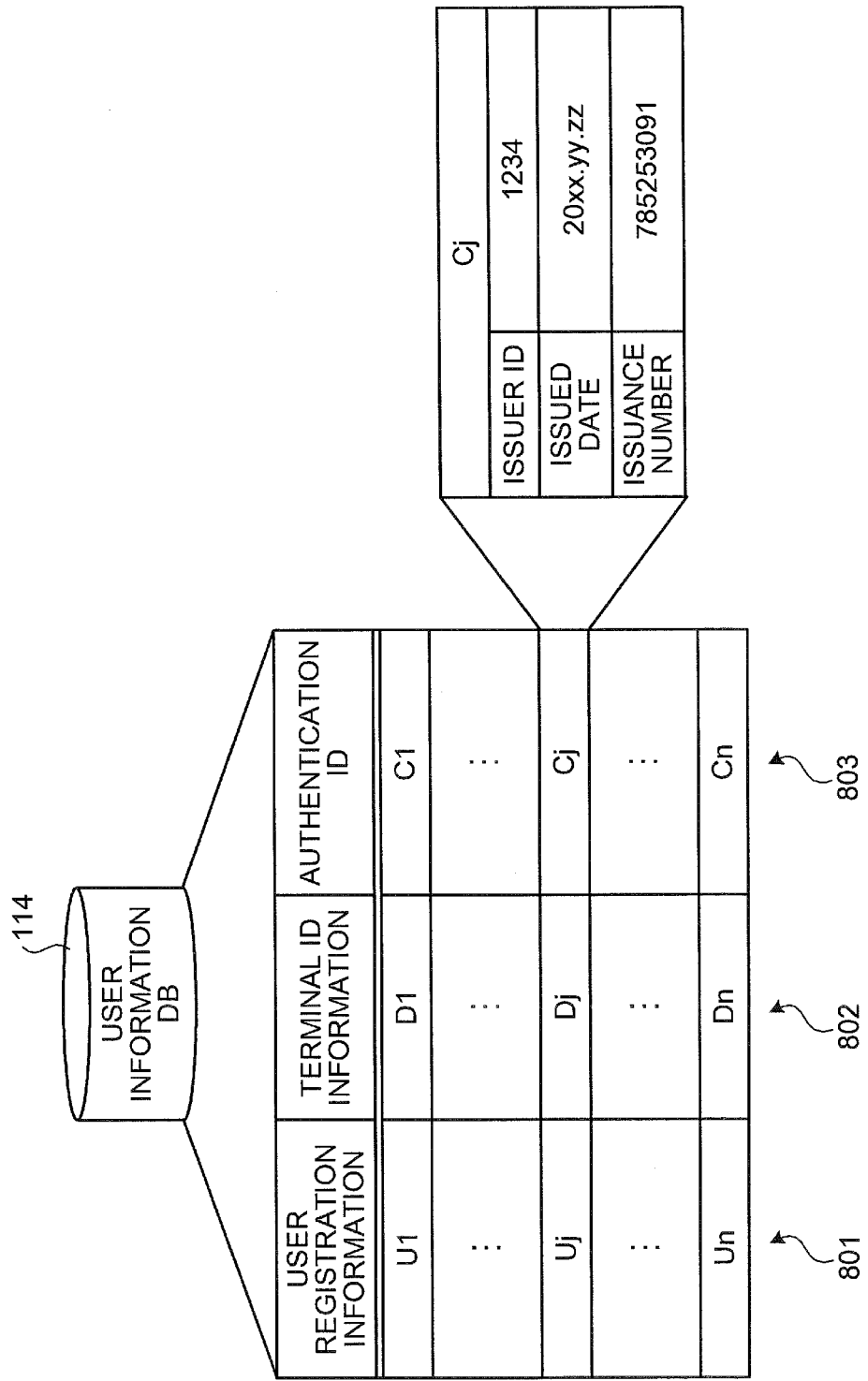
FIG. 8 is a schematic of content stored in a user information DB.

FIG. 8 is a schematic of the content stored in the user information DB 114. As depicted in FIG. 8, the user information DB 114 stores user registration information 801, terminal identification (ID) information 802, and authentication IDs 803. The user registration information 801 is information for identifying a user of the mobile communication terminal 103 and is information registered in the communication server 101 upon purchase or with use of the mobile communication terminal 103. Specifically, for example, the name and address of the user are registered.

The terminal ID information 802 is unique information identifying the mobile communication terminal 103 currently used by a user. Specifically, for example, if the mobile communication terminal 103 is a mobile telephone, the terminal ID information 802 is individually specific identification information (such as a serial number) concerning the mobile telephone. If wireless number portability is available, a mobile telephone number (caller number) may be used.

The authentication ID 803 is a unique ID allocated to each mobile communication terminal 103 and is used for user authentication when a user switches use of the mobile communication terminal 103 to another mobile communication terminal 103. The authentication ID 803 is issued by the communication server 101 and transmitted to the mobile communication terminal 103. The authentication ID 803 includes an issuer ID (e.g., ID of the communication server 101), a date of issue, and a unique issuance number. The authentication ID 803 is updated each time the user switches use to another mobile communication terminal 103. Therefore, after the user switches to another mobile communication terminal 103, the authentication ID 803 before the switch cannot be authenticated.

A communication system according to a first embodiment is a system that limits use of the compressed dictionary content 112A stored in the mobile communication terminal 103 of a user to only the mobile communication terminal 103.

Figure 9:
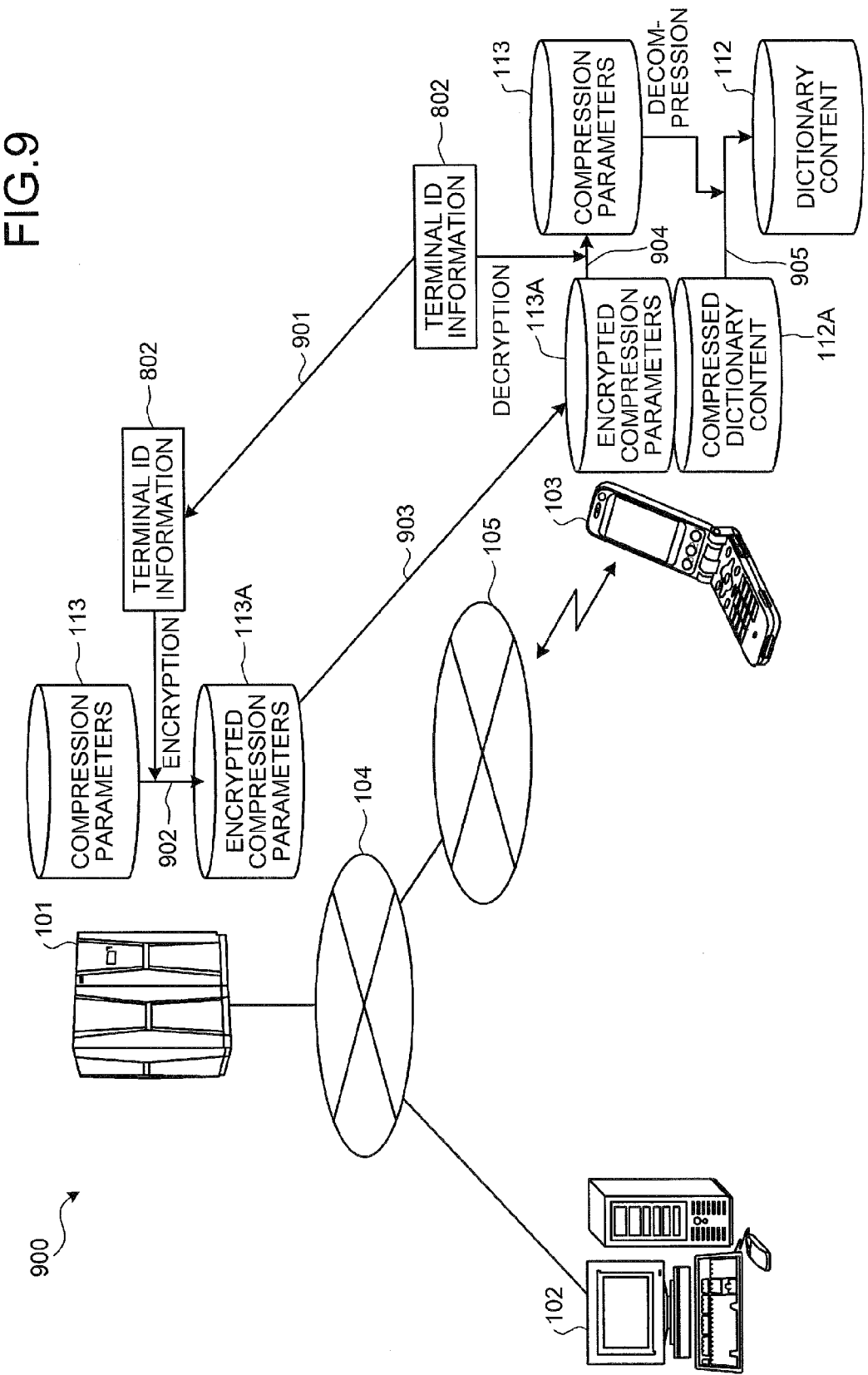
FIG. 9 is a sequencing schematic of a communication system according to a first embodiment.

FIG. 9 is a sequencing schematic of a communication system 900 according to the first embodiment. The mobile communication terminal 103 transmits the terminal ID information 802 to the communication server 101 (901). The communication server 101 uses the terminal ID information 802 received as a master key to encrypt the compression parameters 113 with, for example, the exclusive OR (XOR) (902). The communication server 101 transmits encrypted compression parameters 113A to the mobile communication terminal 103 (903).

The mobile communication terminal 103, using the terminal ID information 802, decrypts the encrypted compression parameters 113A received (904). The decrypted compression parameters 113 are used to decompress the compressed dictionary content 112A (905). The compressed dictionary content 112A may be preliminarily decompressed before a search process, or only the relevant compressed main-body HTML file (hereinafter, simply "compressed file") may be decompressed at the time of a search process. A technique disclosed in International Patent Application PCT/JP2005/021791 may be used to implement such a search with the dictionary content 112 in a compressed state.

Figure 10:
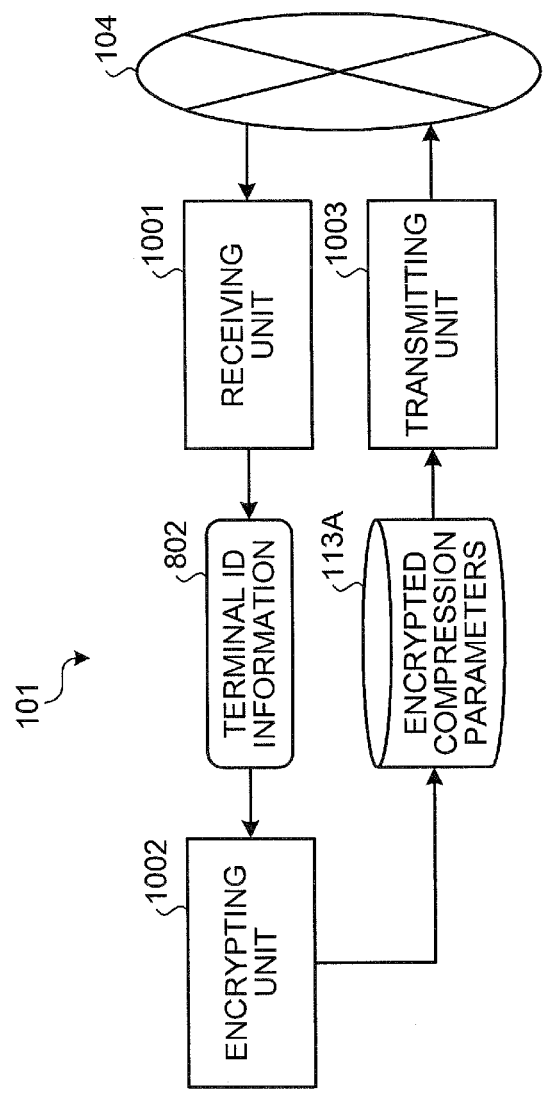
FIG. 10 is a functional diagram of a communication server according to the first embodiment.

FIG. 10 is a functional diagram of the communication server 101 according to the first embodiment. As depicted in FIG. 10, the communication server 101 includes a receiving unit 1001, an encrypting unit 1002, and a transmitting unit 1003.

The receiving unit 1001 receives various types of information from the mobile communication terminal 103. For example, the receiving unit 1001 receives the terminal ID information 802 unique to the mobile communication terminal 103 from the mobile communication terminal 103 having the compressed dictionary content 112A stored therein. Specifically, the terminal ID information 802 is received from the I/F 209 depicted in FIG. 2. A download request for the search engine 111 is also received.

The encrypting unit 1002 uses the terminal ID information 802 received to encrypt the compression parameters 113. Specifically, the terminal ID information 802 received is used as a master key to encrypt the compression parameters 113 with, for example, the exclusive OR (XOR).

The transmitting unit 1003 transmits various types of information to the mobile communication terminal 103. For example, the encrypted compression parameters 113A are transmitted to the mobile communication terminal 103. Specifically, the encrypted compression parameters 113A are transmitted to the mobile communication terminal 103 transmitting the terminal ID information 802 through the I/F 209 depicted in FIG. 2. If the communication server 101 issues the authentication ID 803, the authentication ID 803 is also transmitted to the mobile communication terminal 103.

Specifically, the functions of the receiving unit 1001, the encrypting unit 1002, and the transmitting unit 1003 described above are implemented through an execution of programs (stored in a recording medium such as the ROM 202, the RAM 203, or the HD 205 depicted in FIG. 2) by the CPU 201, for example.

Figure 11:
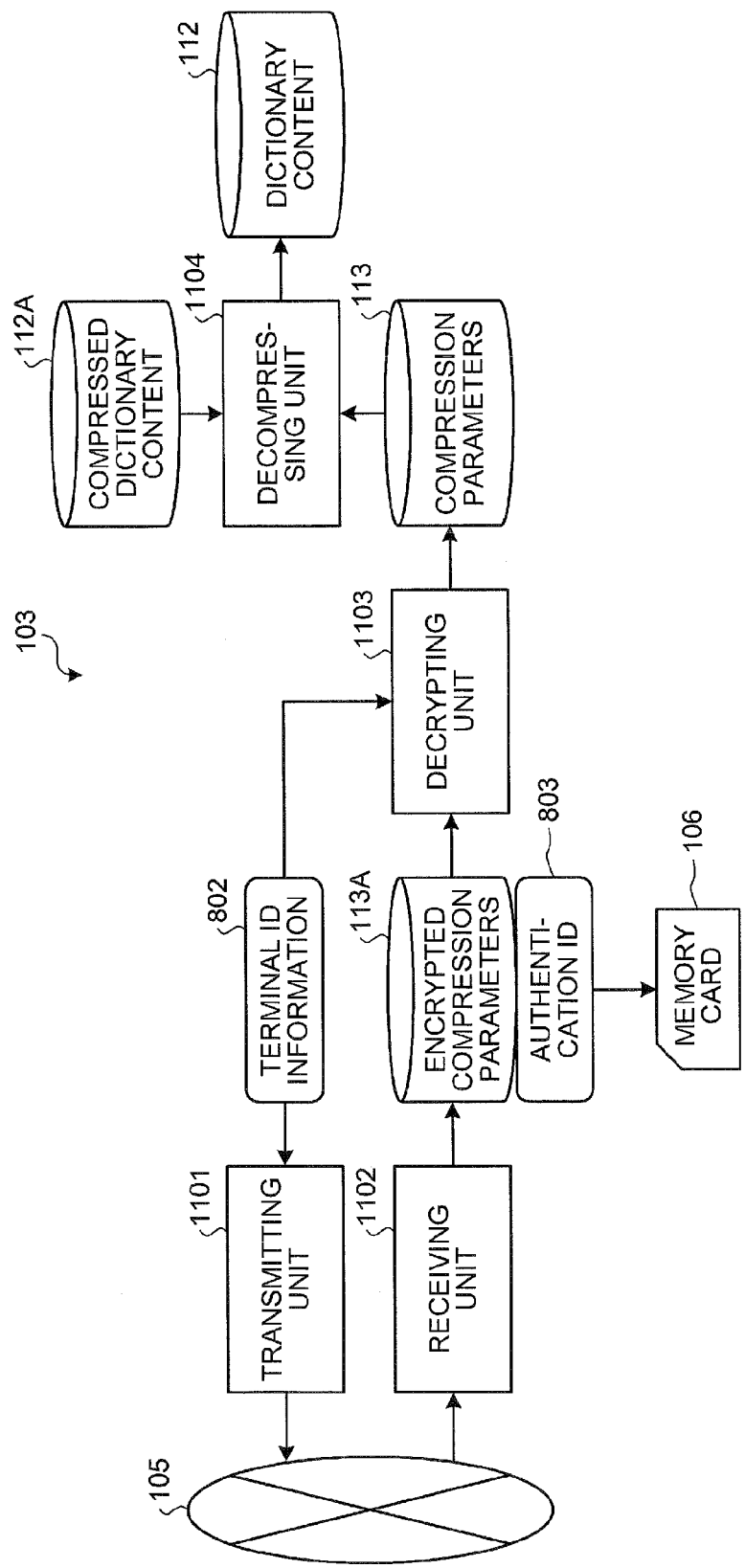
FIG. 11 is a functional diagram of the mobile communication terminal according to the first embodiment.

FIG. 11 is a functional diagram of the mobile communication terminal 103 according to the first embodiment.

As depicted in FIG. 11, the mobile communication terminal 103 includes a transmitting unit 1101, a receiving unit 1102, a decrypting unit 1103, and a decompressing unit 1104. The mobile communication terminal 103 stores therein the compressed dictionary content 112A and the terminal ID information 802 unique to the mobile communication terminal 103.

The transmitting unit 1101 transmits various types of information to the communication server 101. For example, the transmitting unit 1101 transmits the terminal ID information 802 to the communication server 101 storing the compression parameters 113. Specifically, the terminal ID information 802 is transmitted from the wireless communication unit 306 according to an instruction from the CPU 301 or the DSP 302 depicted in FIG. 3. A download request for the search engine 111 is also transmitted.

The receiving unit 1102 receives from the communication server 101, the encrypted compression parameters 113A, which are the compression parameters 113 encrypted using the terminal ID information 802. Specifically, the encrypted compression parameters 113A are received from the wireless communication unit 306. The authentication ID 803 issued by the communication server 101 is also received. If the authentication ID 803 is received, the authentication ID 803 is stored on the memory card 106, which is removable from the mobile communication terminal 103.

The decrypting unit 1103, using the terminal ID information 802, decrypts the encrypted compression parameters 113A received. The decompressing unit 1004 decompresses the compressed dictionary content 112A using the decrypted compression parameters 113, thereby the dictionary content 112 is acquired. Specifically, the functions of the transmitting unit 1101, the receiving unit 1102, the decrypting unit 1103, and the decompressing unit 1104 described above are implemented through an execution of programs (stored in the memory 303 depicted in FIG. 3) by the CPU 301 or by the DSP 302, for example.

Figure 12:
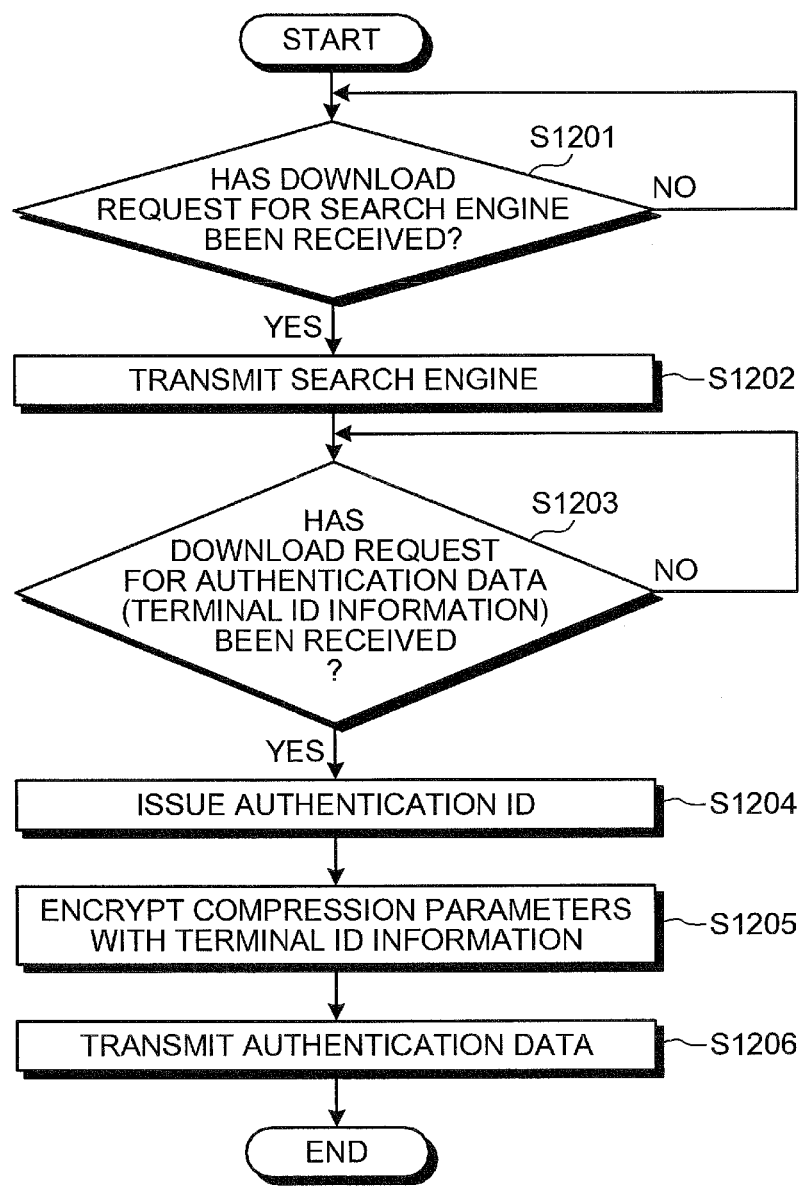
FIG. 12 is a flowchart of a communication process of the communication server according to the first embodiment.

FIG. 12 is a flowchart of a communication process of the communication server 101 according to the first embodiment. As depicted in FIG. 12, the communication server 101 waits until the download request for the search engine 111 is received from the mobile communication terminal 103 (step S1201: NO).

When the download request is received (step S1201: YES), the search engine 111 is transmitted to the requesting mobile communication terminal 103 (step S1202). The communication server 101 waits until the terminal ID information 802 is received (step S1203: NO).

If the terminal ID information 802 is received as a download request for the authentication data (step S1203: YES), the authentication ID 803 is issued (step S1204) and the compression parameters 113 are encrypted with the terminal ID information 802 received (step S1205). The authentication data are transmitted to the mobile communication terminal 103 issuing the request (step S1206). In this case, the authentication data are the encrypted compression parameters 113A and the authentication ID 803.

Figure 13:
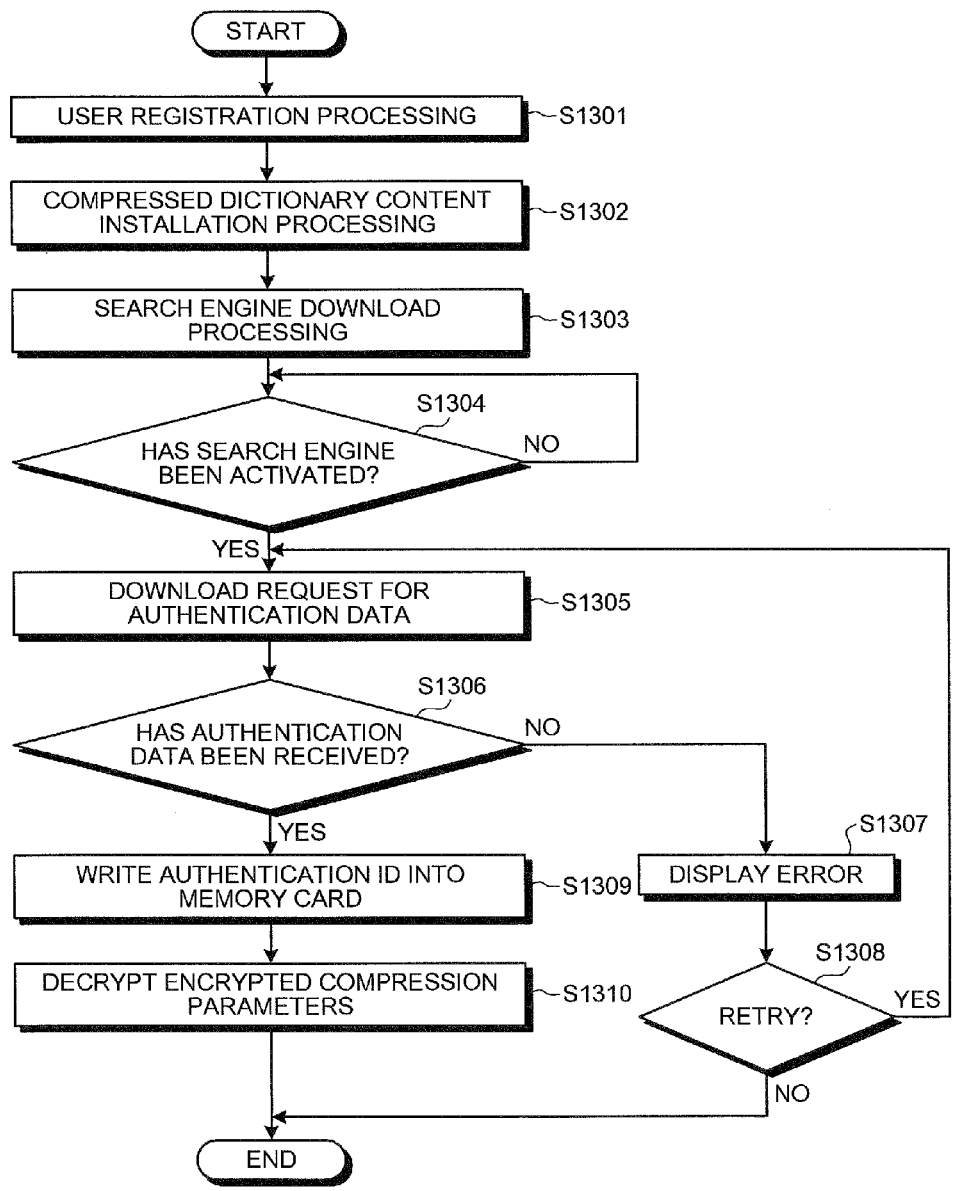
FIG. 13 is a flowchart of a communication process of the mobile communication terminal according to the first embodiment.

FIG. 13 is a flowchart of a communication process of the mobile communication terminal 103 according to the first embodiment. As depicted in FIG. 13, a user registration process is executed (step S1301). The user registration information 801 is stored in the user information DB 114 of the communication server 101 by executing the user registration process. This user registration process is not necessarily executed through communication between the mobile communication terminal 103 and the communication server 101 and the registration may be performed in the communication server 101 when the mobile communication terminal 103 is purchased.

The installation process for the compressed dictionary content 112A is then executed (step S1302). The compressed dictionary content 112A are read and installed from the PC 102 through the memory card 106 into the mobile communication terminal 103 as described above. If the dictionary content 112 is installed in the mobile communication terminal 103 in advance, this installation process is not necessary.

The download process of the search engine 111 is executed (step S1303). Specifically, the download request for the search engine 111 is transmitted to the communication server 101. The search engine 111 transmitted from the communication server 101 is then stored.

The activation of the search engine 111 is waited for (step S1304: NO), and when the search engine 111 is activated (step S1304: YES), by the download function of the search engine 111, the terminal ID information 802 is transmitted as a download request for the authentication data to the communication server 101 (step S1305).

It is determined whether the authentication data have been received (step S1306). Specifically, it is determined whether the authentication data have been received within a predetermined time. If the authentication data are not received within the predetermined time (step S1306: NO), an error is displayed on a display screen of the mobile communication terminal 103 (step S1307) to prompt a retry (step S1308).

If a retry is received (step S1308: YES), the process returns to step S1305. If no retry is received (step S1308: NO), a sequence of the process is terminated.

If the authentication data are received at step S1306 (step S1306: YES), the authentication ID 803 included in the authentication data is written into the memory card 106 (step S1309), and the encrypted compression parameters 113A included in the authentication data are decrypted with the terminal ID information 802 (step S1310).

Figure 14:
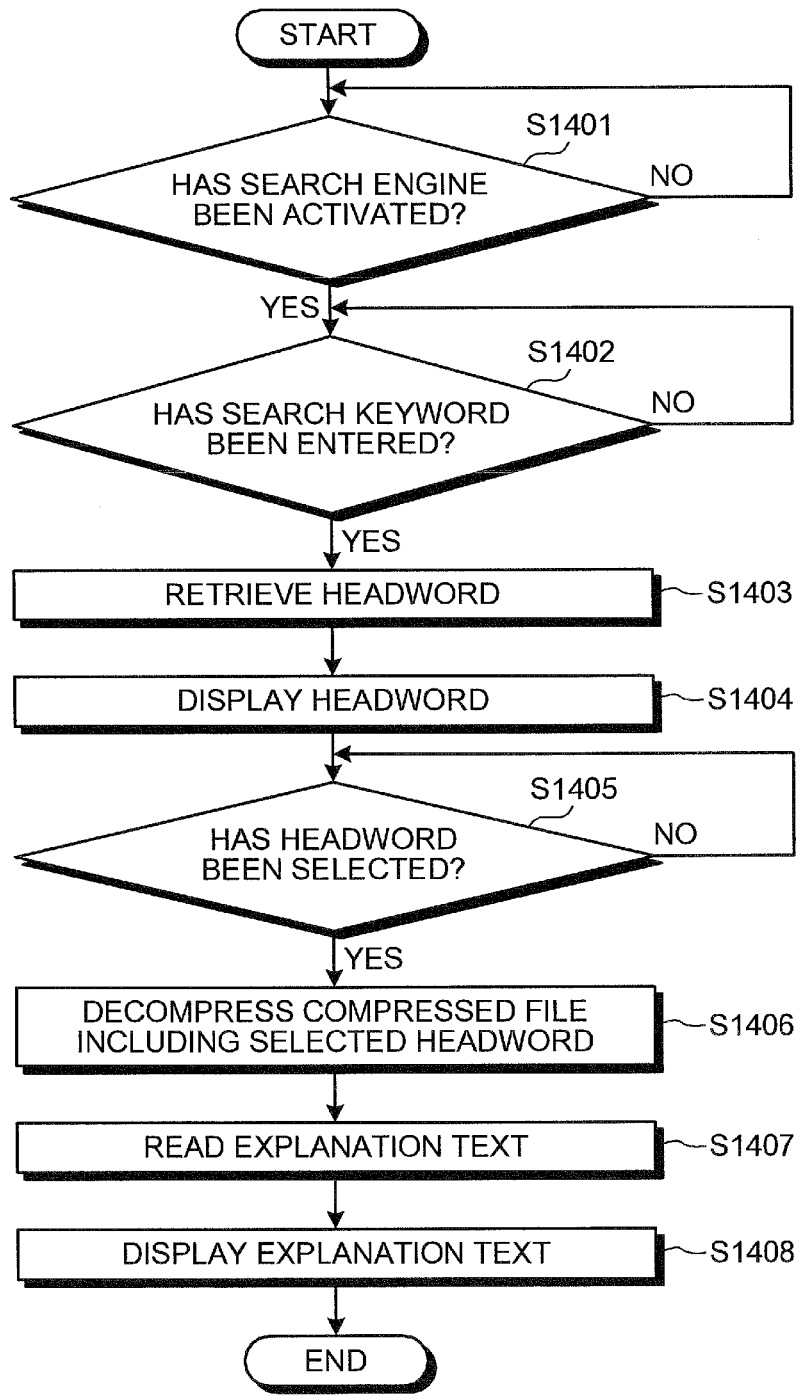
FIG. 14 is a flowchart of a search process of the mobile communication terminal according to the first embodiment.

FIG. 14 is a flowchart of a search process of the mobile communication terminal 103 according to the first embodiment. As depicted in FIG. 14, activation of the search engine 111 is waited for (step S1401: NO), and when the search engine 111 is activated (step S1401: YES), the entry of a search keyword is waited for (step S1402: NO).

When a search keyword has been entered (step S1402: YES), headwords matching or relevant to the search keyword are retrieved from the index data 122 (step S1403). For example, in the case of a complete match with the search keyword, the headword may be extracted from the index data 122. Alternatively, in the case of a partial match with the search keyword, headwords relevant to the search keyword may be extracted.

The retrieved headwords are displayed on the display screen (step S1404). The selection of a headword is waited for (step S1405: NO), and when a headword is selected (step S1405: YES), the compressed file including the headword is decompressed using the compression parameters 113 (step S1406). If the compressed dictionary content 112A is already decompressed before this search process, this decompression process is not necessary.

Since the headwords and the compressed files are correlated by the heading data 123, the compressed file including the selected headword may be identified and decompressed by reference to the heading data 123. The explanation text of the selected headword is read out from the decompressed main-body HTML file (step S1407). The read explanation text is displayed on the display screen (step S1408).

According to the first embodiment, the dictionary content 112 may be compressed using the compression parameters 113 common to the main-body HTML files f and installed into the mobile communication terminal 103 through the memory card 106 or the optical disc 107, thereby achieving a reduction in the volume of data installed.

Since the compression parameters 113 are encrypted and downloaded using the terminal ID information 802 unique to the mobile communication terminal 103, the addition of unique information to the compressed dictionary content 112A is not needed to enhance security such as the prevention of alteration and the prevention of unauthorized use.

As the compression parameters 113 are encrypted using the terminal ID information 802 unique to the mobile communication terminal 103, the same effect can be achieved as encrypting the dictionary content 112. Therefore, copyright protection similar to that obtained by encrypting the dictionary content 112 may be achieved without encryption.

Since the volume of the authentication data (the encrypted compression parameters 113A and the authentication ID 803)

is much smaller than the dictionary content 112, the authentication data may be downloaded by packet communication through the mobile telephone network 105.

Therefore, the download time may be reduced and communication costs may be reduced drastically. Since the mobile communication terminal 103 decrypts and initializes the compression parameters 113, only the decompression may be performed at the time of searching to implement high-speed searching.

A communication system according to a second embodiment is a system for authenticating the validity of a switch to another mobile communication terminal 103 by the user to safely transmit the compression parameters 113 only to the mobile communication terminal 103 of the user.

According to the second embodiment, the mobile communication terminal 103 before the switch is referred to as an "old mobile communication terminal 103A" and the mobile communication terminal 103 of the same user after the switch is referred to as a "new mobile communication terminal 103B". Similarly, the authentication ID 803 issued to the old mobile communication terminal 103A is referred to as an "old authentication ID 803A", and the authentication ID 803 issued to the new mobile communication terminal 103B is referred to as a "new authentication ID 803B". The terminal ID information 802 of the new mobile communication terminal 103B is referred to as "new terminal ID information 802B".

Figure 15:
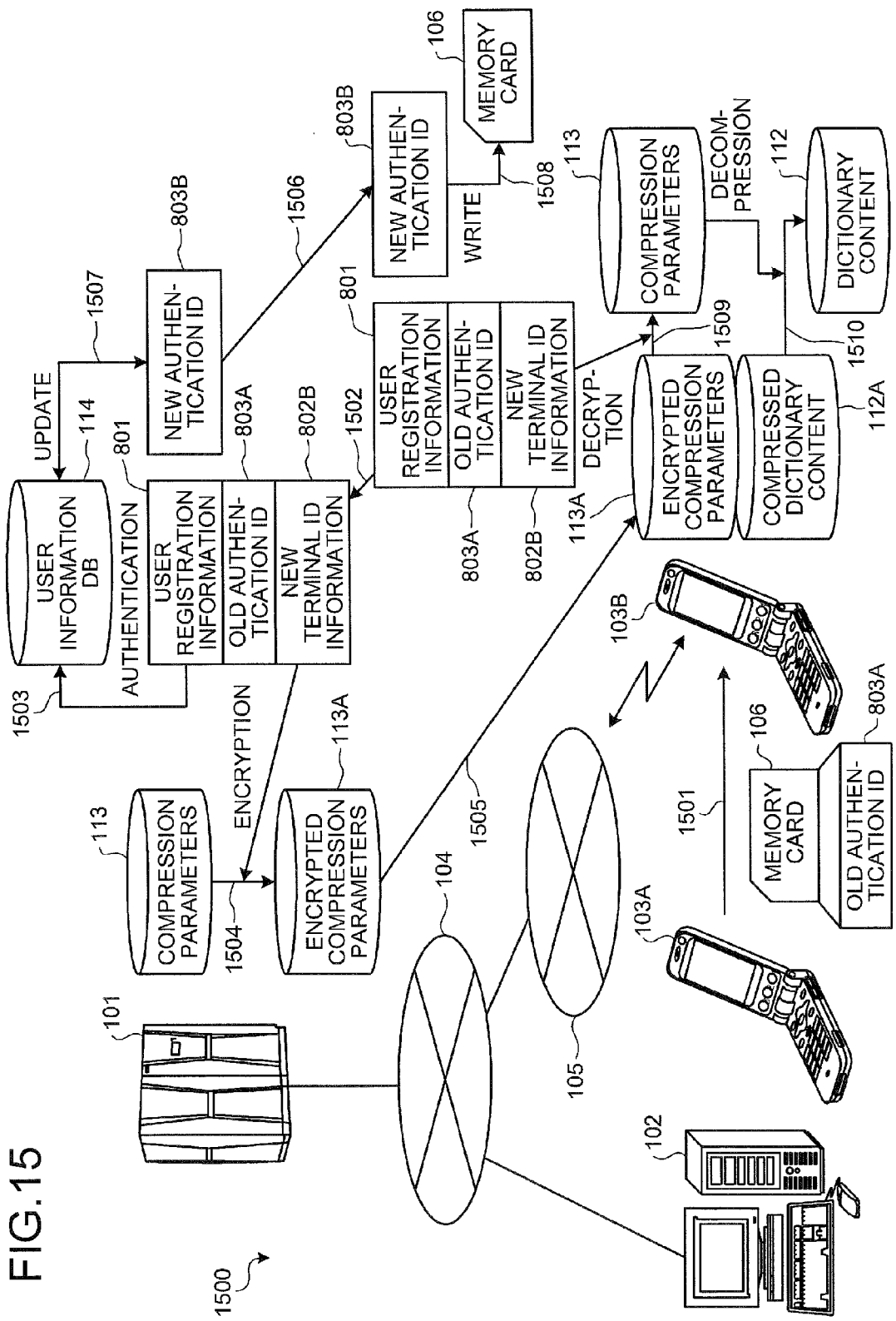
FIG. 15 is a sequencing schematic of the communication system according to a second embodiment.

FIG. 15 is a sequencing schematic of a communication system 1500 according to the second embodiment. It is assumed that the compressed dictionary content 112A is stored in the new mobile communication terminal 103B. First, the old authentication ID 803A is read into the new mobile communication terminal 103B by attaching the memory card 106 having the old authentication ID 803A of the old mobile communication terminal 103A stored thereon to the new mobile communication terminal 103B (1501).

The new mobile communication terminal 103B transmits the user registration information 801, the old authentication ID 803A, and the new terminal ID information 802B to the communication server 101 (1502). The user registration information 801 transmitted is information serving as a clue for reading out the authentication ID 803 registered in the communication server 101. Therefore, provided the information is sufficient to enable to identification of the user, all the items of the user registration information 801 registered in the user information DB 114 may not be transmitted.

The communication server 101 uses the user registration information 801 received as a clue to compare the old authentication ID 803A with the authentication ID 803 registered in the user information DB 114. The user of the new mobile communication terminal 103B is authenticated as the same user as the user of the old mobile communication terminal 103A, i.e., the validity of the switch to another mobile communication terminal 103 by the user is authenticated (1503).

If the validity of the switch is authenticated, the new terminal ID information 802B received is used as a master key to encrypt the compression parameters 113 with, for example, the exclusive OR (XOR) (1504). The communication server 101 then transmits the encrypted compression parameters 113A to the new mobile communication terminal 103B (1505).

The communication server 101 issues and transmits the new authentication ID 803B to the new mobile communication terminal 103B (1506) and updates the authentication ID 803 registered in the user information DB 114 from the old authentication ID 803A to the new authentication ID 803B (1507).

The new mobile communication terminal 103B writes, onto the memory card 106, the new authentication ID 803B received (1508). The new mobile communication terminal 103B decrypts the encrypted compression parameters 113A received using the new terminal ID information 802B (1509). The decrypted compression parameters 113 are used to decompress the compressed dictionary content 112A (1510).

The compressed dictionary content 112A may preliminarily be decompressed before the search process, or only a relevant compressed file may be decompressed at the time of the search process. A technique disclosed in International Patent Application PCT/JP2005/021791 may be used to implement a search the dictionary content 112 is in a compressed state.

Figure 16:
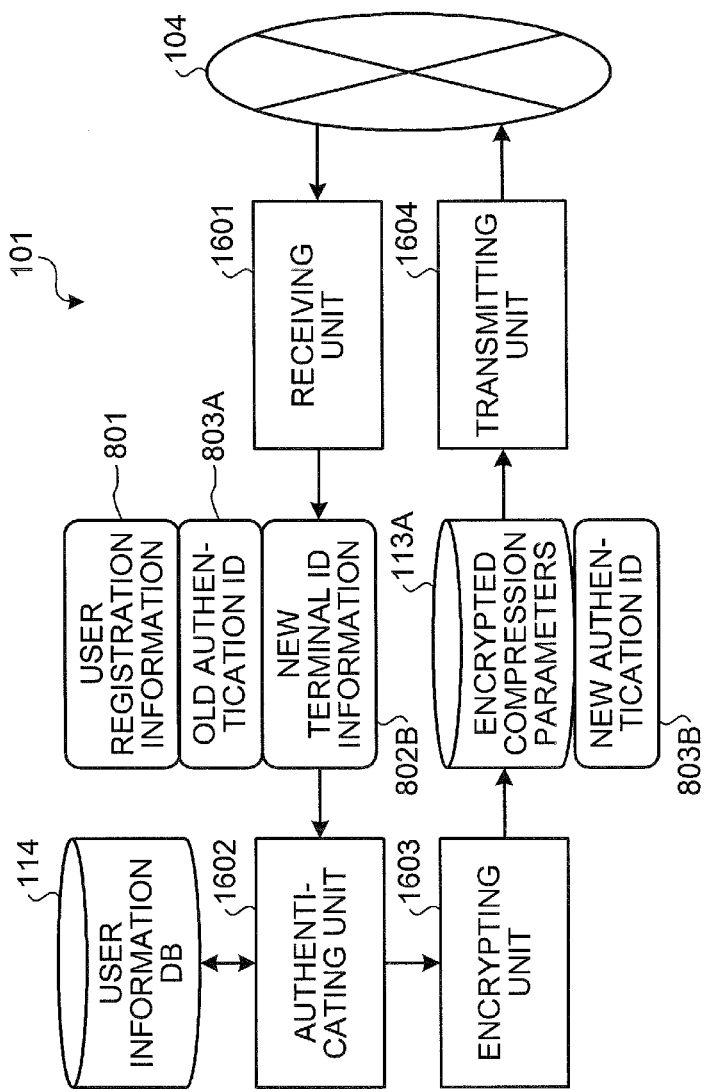
FIG. 16 is a functional diagram of the communication server according to the second embodiment.

FIG. 16 is a functional diagram of the communication server 101 according to the second embodiment. As depicted in FIG. 16, the communication server 101 includes a receiving unit 1601, an authenticating unit 1602, an encrypting unit 1603, and a transmitting unit 1604.

The receiving unit 1601 receives various types of information from the new mobile communication terminal 103B. For example, the receiving unit 1001 receives the new terminal ID information 802B and the old authentication ID 803A from the new mobile communication terminal 103B storing the compressed dictionary content 112A. Specifically, the terminal ID information 802 is received from the I/F 209 depicted in FIG. 2. A download request for the search engine 111 is also received.

The authenticating unit 1602 determines (compares) whether the old authentication ID 803A is identical to the authentication ID 803 registered in the user information DB 114. If the IDs are identical, the user of the new mobile communication terminal 103B is authenticated as the same user as the user of the old mobile communication terminal 103A, i.e., the validity of the switch to another mobile communication terminal 103 by the user is authenticated, and if the IDs are not identical, the authentication is not achieved.

The encrypting unit 1603 uses the new terminal ID information 802B received to encrypt the compression parameters 113. Specifically, the new terminal ID information 802B received is used as a master key to encrypt the compression parameters 113 with, for example, the exclusive OR (XOR).

The transmitting unit 1604 transmits various types of information to the new mobile communication terminal 103B. For example, the encrypted compression parameters 113A are transmitted to the new mobile communication terminal 103B. Specifically, the encrypted compression parameters 113A are transmitted to the mobile communication terminal 103 transmitting the terminal ID information 802 through the I/F 209 depicted in FIG. 2. If the communication server 101 issues the new authentication ID 803B, the new authentication ID 803 is also transmitted to the new mobile communication terminal 103B.

Specifically, the functions of the receiving unit 1601, the authenticating unit 1602, the encrypting unit 1603, and the transmitting unit 1604 described above are implemented by an execution of programs stored in a recording medium such as the ROM 202, the RAM 203, or the HD 205 depicted in FIG. 2 by the CPU 201, for example.

Figure 17:
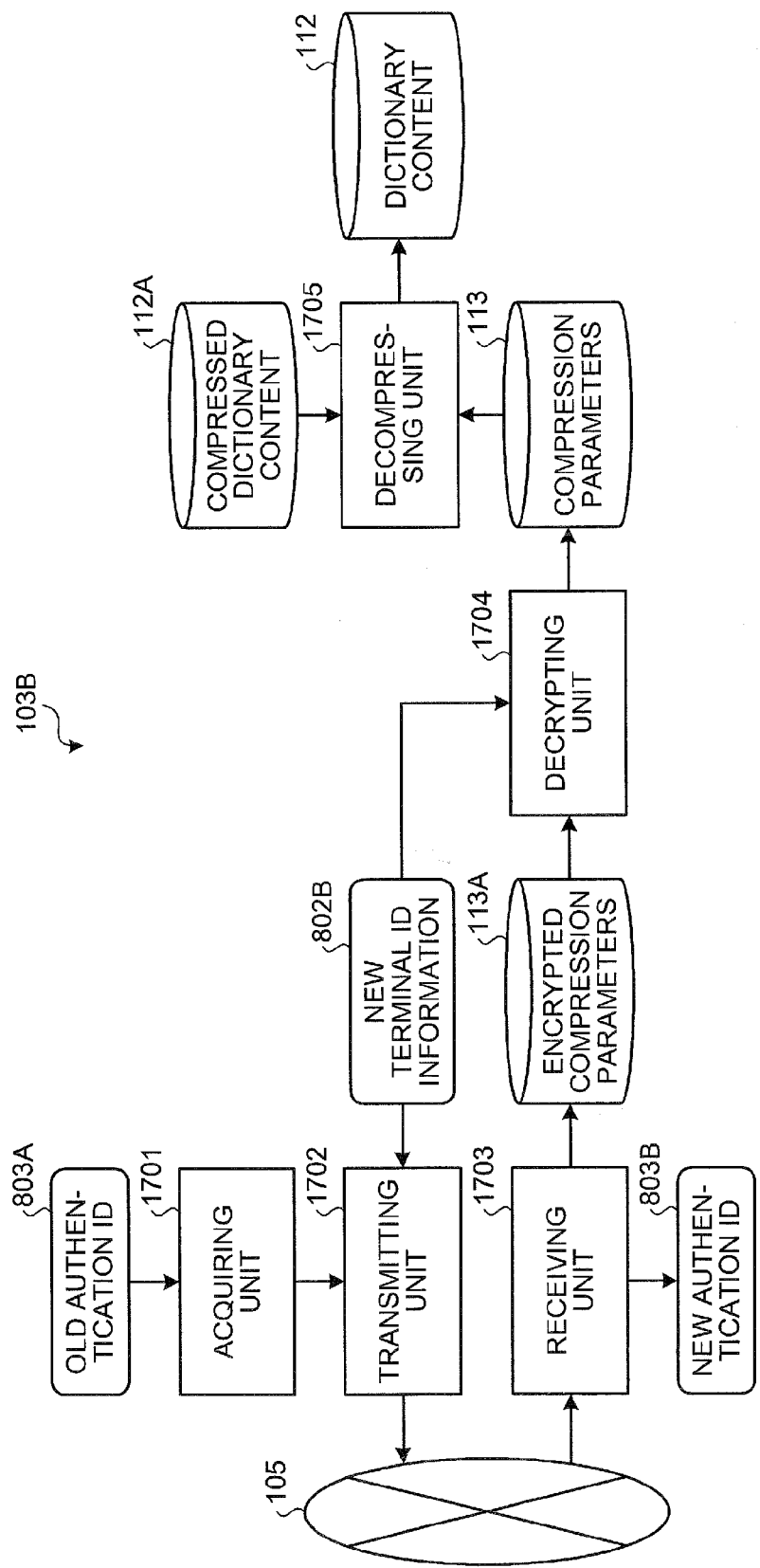
FIG. 17 is a functional diagram of a configuration of a new mobile communication terminal according to the second embodiment.

FIG. 17 is a functional diagram of a configuration of the new mobile communication terminal 103B according to the second embodiment. As depicted in FIG. 17, the new mobile communication terminal 103B includes an acquiring unit 1701, a transmitting unit 1702, a receiving unit 1703, a decrypting unit 1704, and a decompressing unit 1705. The new mobile communication terminal 103B stores the compressed dictionary content 112A and the new terminal ID information 802B unique to the new mobile communication terminal 103B.

The acquiring unit 1701 acquires the old authentication ID 803A of the old mobile communication terminal 103A. Specifically, for example, the old authentication ID 803A stored in the memory card 106 is read through the connector 304 depicted in FIG. 3 by attaching the memory card 106 to the new mobile communication terminal 103B. The old authentication ID 803A may be imported through noncontact communication (such as infrared communication) between the old mobile communication terminal 103A and the new mobile communication terminal 103B.

The transmitting unit 1702 transmits various types of information to the communication server 101. For example, the transmitting unit 1702 transmits the new terminal ID information 802B and the old authentication ID 803A to the communication server 101 storing the compression parameters 113. Specifically, the new terminal ID information 802B and the old authentication ID 803A are transmitted from the wireless communication unit 306 according to an instruction from the CPU 301 or the DSP 302 depicted in FIG. 3. A download request for the search engine 111 is also transmitted.

The receiving unit 1703 receives from the communication server 101, the encrypted compression parameters 113A, which are compression parameters 113 encrypted using the new terminal ID information 802B. Specifically, the encrypted compression parameters 113A are received from the wireless communication unit 306. The new authentication ID 803B issued by the communication server 101 is also received. If the new authentication ID 803B is received, the new authentication ID 803B is stored in the memory card 106 removable from the new mobile communication terminal 103B.

The decrypting unit 1704 decrypts the encrypted compression parameters 113A received using the new terminal ID information 802B. The decompressing unit 1705 decompresses the compressed dictionary content 112A using the decrypted compression parameters 113, thereby the dictionary contents are acquired.

Specifically, the functions of the acquiring unit 1701, the transmitting unit 1702, the receiving unit 1703, the decrypting unit 1704, and the decompressing unit 1705 described above are implemented through the execution of programs (stored in the memory 303 depicted in FIG. 3) by the CPU 301 or by the DSP 302, for example.

Figure 18:
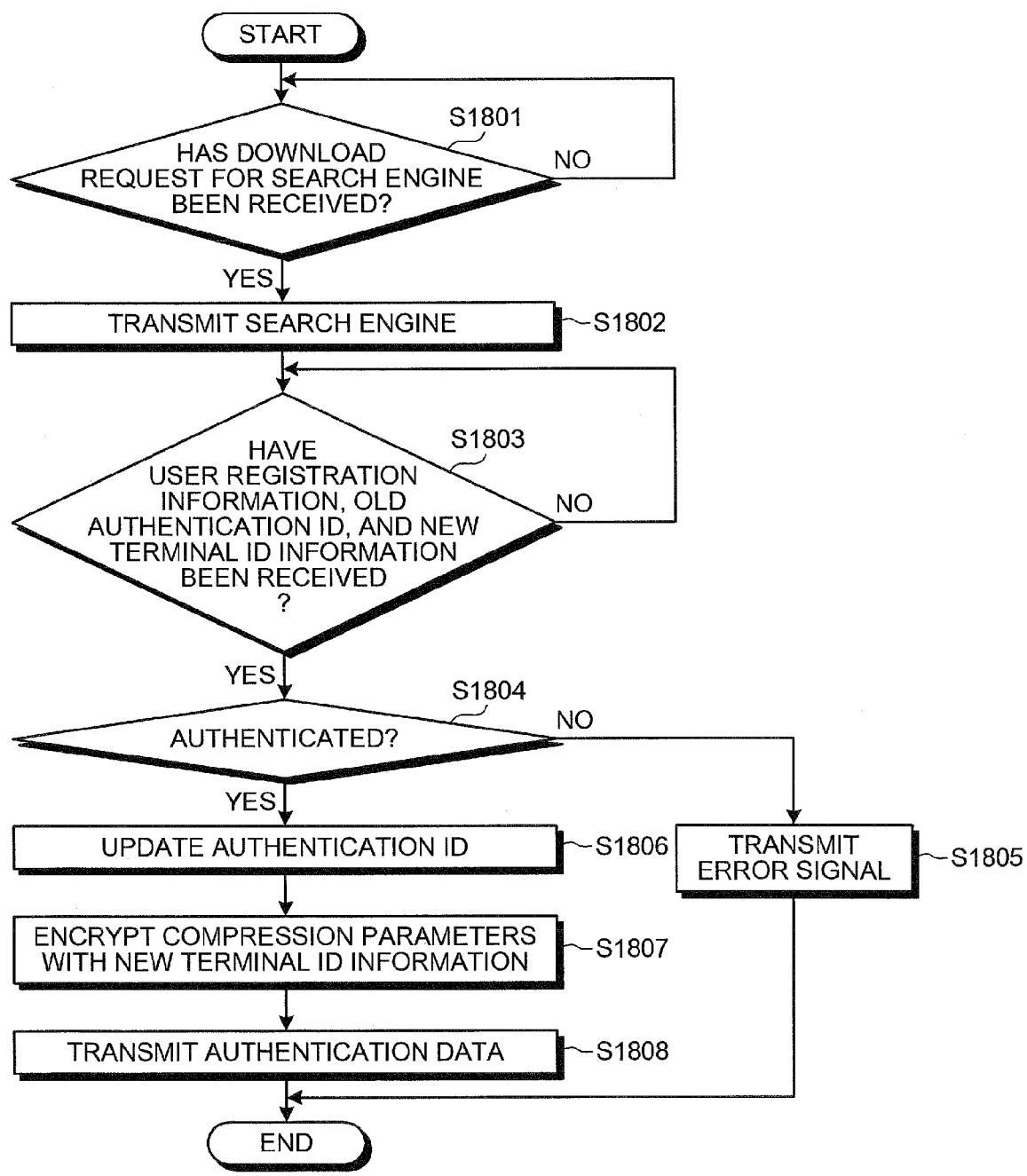
FIG. 18 is a flowchart of the communication process of the communication server according to the second embodiment.

FIG. 18 is a flowchart of the communication process of the communication server 101 according to the second embodiment. As depicted in FIG. 18, the communication server 101 waits until the download request for the search engine 111 is received from the new mobile communication terminal 103B (step S1801: NO).

When the download request is received (step S1801: YES), the search engine 111 is transmitted to the new mobile communication terminal 103B (step S1802). The communication server 101 waits until the user registration information 801, the old authentication ID 803A, and the new terminal ID information 802B are received (step S1803: NO).

When the user registration information 801, the old authentication ID 803A, and the new terminal ID information 802B are received (step S1803: YES), the user information DB 114 is used to authenticate the validity of the switch to another mobile communication terminal 103 by the user (step S1804). If authentication is not achieved (step S1804: NO), an error signal is transmitted to the new mobile communication terminal 103B to indicate that authentication cannot be achieved (step S1805), thereby terminating a sequence of the processing.

On the other hand, if the authentication is achieved (step S1804: YES), the authentication ID 803 registered in the user information DB 114 is updated from the old authentication ID 803A to the new authentication ID 803B newly issued (step S1806). The compression parameters 113 are encrypted with the new terminal ID information 802B received (step S1807). The authentication data are transmitted to the new mobile communication terminal 103B (step S1808). In this case, the authentication data are the encrypted compression parameters 113A and the new authentication ID 803B.

Figure 19:
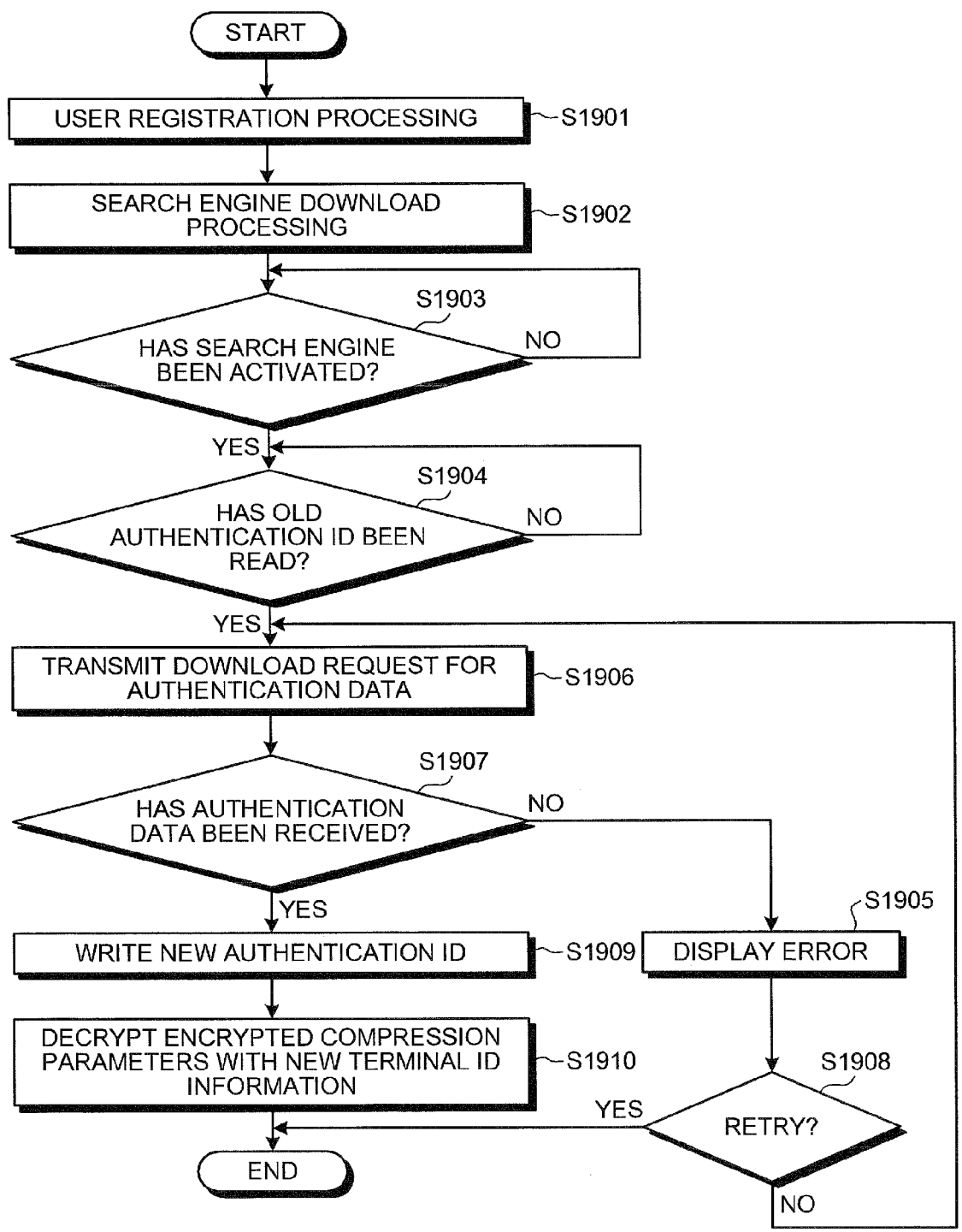
FIG. 19 is a flowchart of the communication process of the new mobile communication terminal according to the second embodiment.

FIG. 19 is a flowchart of the communication process of the new mobile communication terminal 103B according to the second embodiment. As depicted in FIG. 19, a user registration process (step S1901) and a download process of the search engine 111 (step S1902) are executed.

This user registration process (step S1901) is identical to the user registration process (step S1301) described in the first embodiment. The download process of the search engine 111 (step S1902) is identical to the download process of the search engine 111 (step S1303) described in the first embodiment.

The activation of the search engine 111 is waited for (step S1903: NO), and when the search engine 111 is activated (step S1903: YES), it is determined whether the old authentication ID 803A has been read (step S1904). If the old authentication ID 803A has not been read (step S1904: NO), an error is displayed on the display screen (step S1905).

On the other hand, if the old authentication ID 803A has been read (step S1904: YES), a download request for the authentication data (the user registration information 801, the old authentication ID 803A, and the new terminal ID information 802B) is transmitted to the communication server 101 using the download function of the search engine 111 (step S1906).

Subsequently, it is determined whether the authentication data have been received (step S1907). Specifically, it is determined whether the authentication data are received within a predetermined time. If the authentication data are not received within the predetermined time (step S1907: NO), the process goes to step S1905 to display an error on the display screen of the new mobile communication terminal 103B.

If the error is displayed at step S1905, a retry may be received (step S1908). If a retry is received (step S1908: YES), the process returns to step S1904. If no retry is received (step S1908: NO), a sequence of the process is terminated.

If the authentication data are received at step S1907 (step S1907: YES), the new authentication ID 803B included in the authentication data is written into the memory card 106 (step S1909), and the encrypted compression parameters 113A included in the authentication data are decrypted with the new terminal ID information 802B (step S1910). The search process of the new mobile communication terminal 103B is identical to the search process of the mobile communication terminal 103 and is not described in the second embodiment.

According to the second embodiment, effects identical to the first embodiment may be achieved. As the validity of the switch to another mobile communication terminal 103 by the user can be authenticated, unauthorized use of the dictionary content 112 associated with the switch can be prevented.

While the compressed dictionary content 112A are preliminarily stored in the mobile communication terminal 103 in the first embodiment, a communication system according to a third embodiment is a system where only the index data 122 and heading data 2100 (see FIG. 21) used for the searching is preliminarily stored in the mobile communication terminal 103 and a compressed file is downloaded each time the search process is executed.

Figure 20:
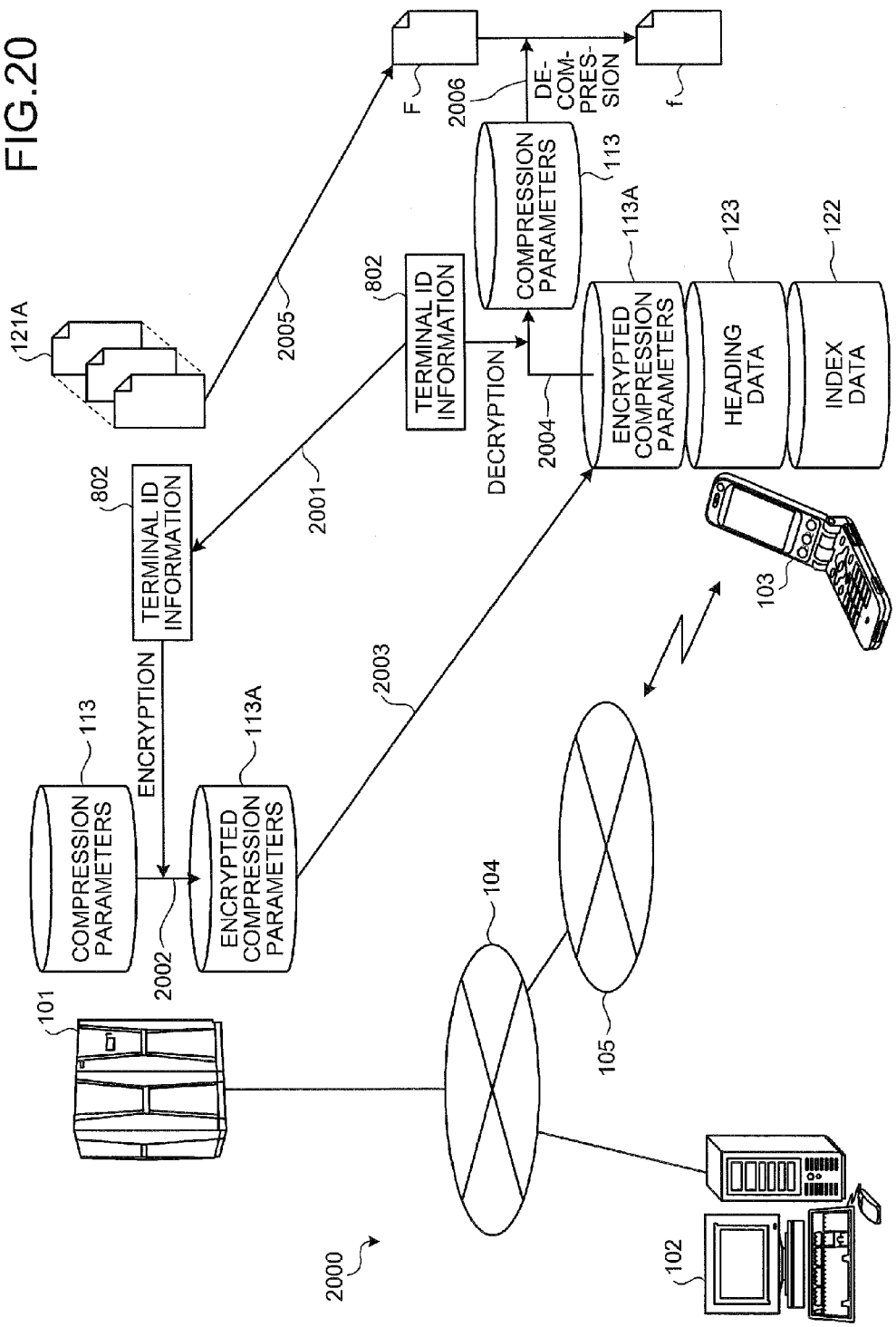
FIG. 20 is a sequencing schematic of the communication system according to a third embodiment.

FIG. 20 is a sequencing schematic of a communication system 2000 according to the third embodiment. As depicted in FIG. 20, the mobile communication terminal 103 transmits the terminal ID information 802 to the communication server 101 (2001). The communication server 101 uses the terminal ID information 802 received as a master key to encrypt the compression parameters 113 with, for example, the exclusive OR (XOR) (2002). The communication server 101 transmits encrypted compression parameters 113A to the mobile communication terminal 103 (2003).

The mobile communication terminal 103, using the terminal ID information 802, decrypts the encrypted compression parameters 113A received (2004). For each search process, a compressed file F including a search candidate headword is downloaded from the compressed dictionary data 121A (the dictionary data 121 compressed with the compression parameters 113) stored in the communication server 101 (2005). The compressed file F downloaded is installed and decompressed using the compression parameters 113 (2006).

The explanation text of the headword can be read out from the decompressed main-body HTML file f. Since the compressed file F is saved in the mobile communication terminal 103, if the compressed file F has already been installed, the compressed file F does not have to be downloaded again.

Figure 21:
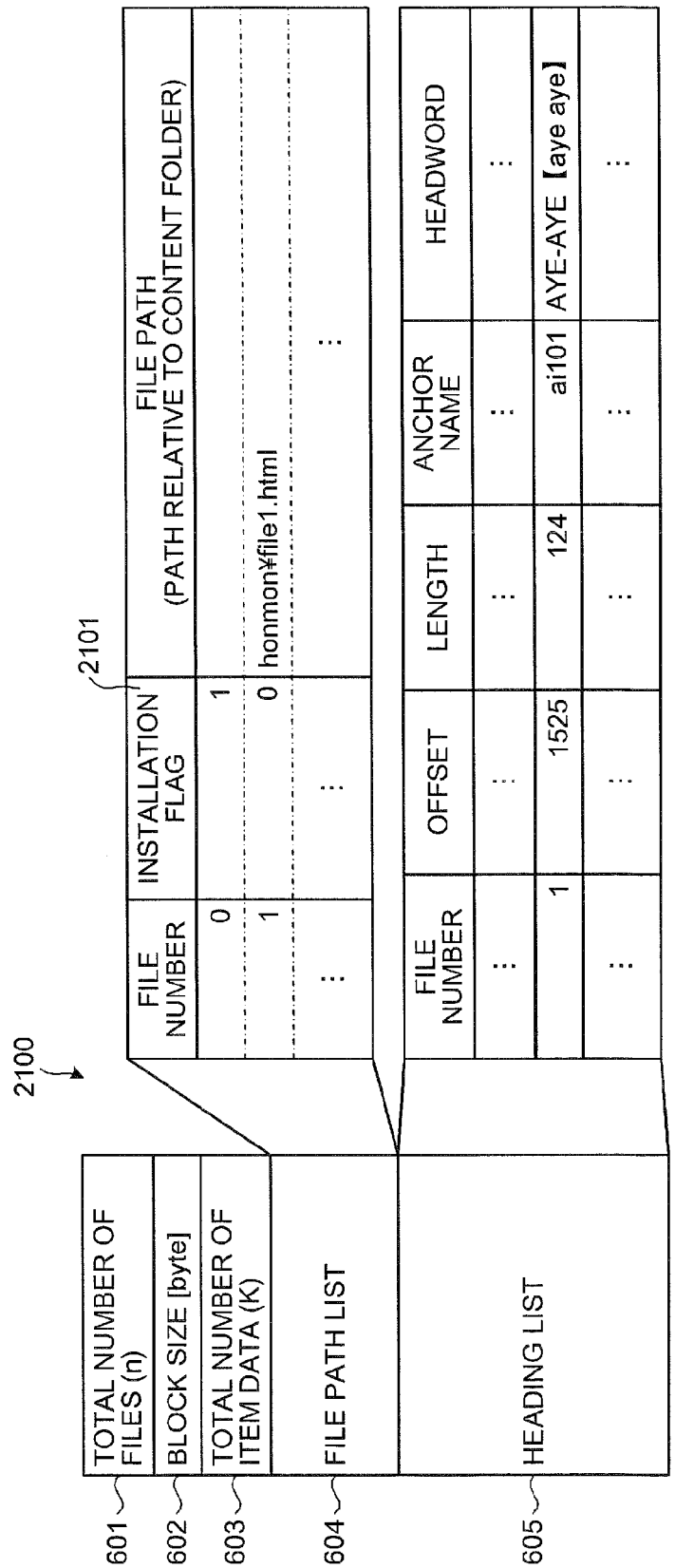
FIG. 21 is a schematic of a data configuration of the heading data according to the third embodiment.

FIG. 21 is a schematic of a data configuration of the heading data 2100 according to the third embodiment. Constituent elements identical to those of the data configuration depicted in FIG. 6 are given identical reference numerals and description thereof is omitted.

As depicted in FIG. 21, installation flags 2101 are additionally set in the heading data 2100. A flag of "1" denotes that a file has been installed and a flag of "0" denotes that a file has not been downloaded. The headword list and the file path list are correlated through the file numbers. For example, if a headword "aye-aye" is retrieved, the file number thereof is "1" and, therefore, the installation flag corresponding to the file number 1 is checked in the file path list.

Since the download flag is "0" in this case, this means that the compressed file with the file number 1 has not been downloaded. Therefore, the compressed file with the file number 1 may be downloaded from the communication server 101 to display the explanation text of the headword "aye-aye" on the mobile communication terminal 103.

Figure 22:
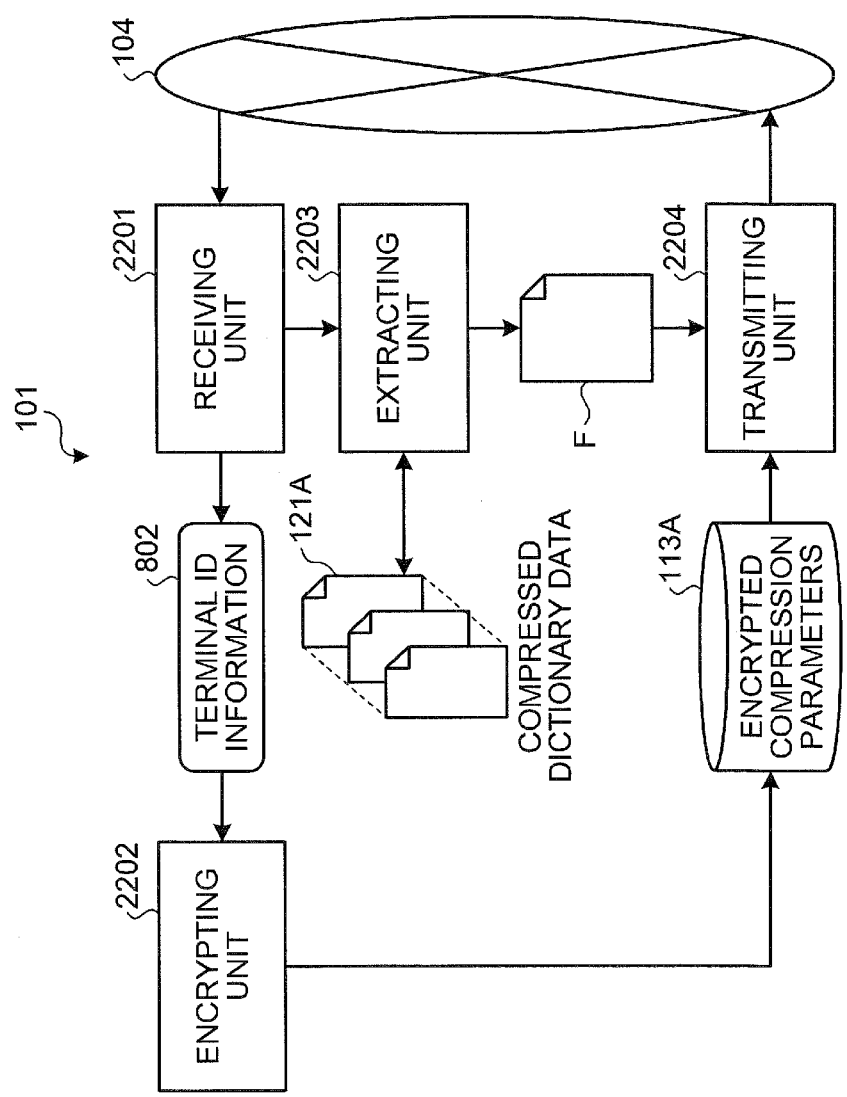
FIG. 22 is a functional diagram of the communication server according to the third embodiment.

FIG. 22 is a functional diagram of the communication server 101 according to the third embodiment. As depicted in FIG. 22, the communication server 101 includes a receiving unit 2201, an encrypting unit 2202, an extracting unit 2203, and a transmitting unit 2204.

The receiving unit 2201 receives various types of information from the mobile communication terminal 103. For example, the receiving unit 2201 receives the terminal ID information 802 unique to the mobile communication terminal 103. Specifically, the terminal ID information 802 is received from the I/F 209 depicted in FIG. 2. The download request for the search engine 111 is also received.

The encrypting unit 2202 uses the terminal ID information 802 received to encrypt the compression parameters 113. Specifically, the terminal ID information 802 received is used as a master key to encrypt the compression parameters 113 with, for example, the exclusive OR (XOR).

The extracting unit 2203 extracts, from the compressed dictionary data 121A, a compressed file according to a download request. The transmitting unit 2004 transmits various types of information to the mobile communication terminal 103. For example, the encrypted compression parameters 113A and the extracted compressed file are transmitted to the mobile communication terminal 103.

Specifically, the encrypted compression parameters 113A are transmitted to the mobile communication terminal 103 transmitting the terminal ID information 802 through the I/F 209 depicted in FIG. 2. If the communication server 101 issues the authentication ID 803, the authentication ID 803 is also transmitted to the mobile communication terminal 103.

Specifically, the functions of the receiving unit 2201, the encrypting unit 2202, the extracting unit 2203, and the transmitting unit 2004 described above are implemented by an execution of programs (stored in a recording medium such as the ROM 202, the RAM 203, or the HD 205 depicted in FIG. 2) by the CPU 201, for example.

Figure 23:
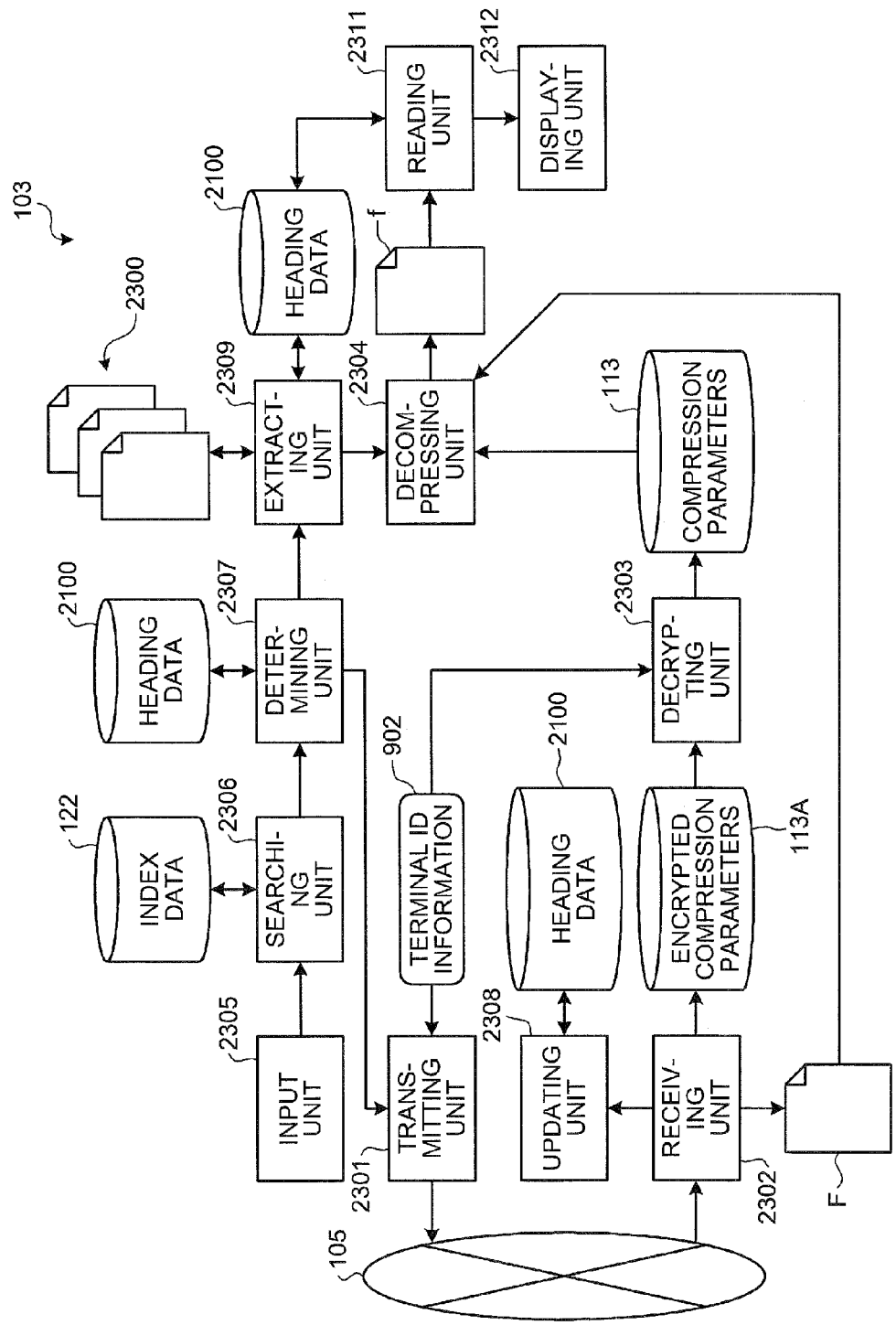
FIG. 23 is a functional diagram of the mobile communication terminal according to the third embodiment.

FIG. 23 is a functional diagram of the mobile communication terminal 103 according to the third embodiment.

As depicted in FIG. 23, the mobile communication terminal 103 includes a transmitting unit 2301, a receiving unit 2302, a decrypting unit 2303, a decompressing unit 2304, an input unit 2305, a searching unit 2306, a determining unit 2307, an updating unit 2308, an extracting unit 2309, a reading unit 2311, and a displaying unit 2312. The mobile communication terminal 103 stores the index data 122, the heading data 2100, and the terminal ID information 802 unique to the mobile communication terminal 103.

The transmitting unit 2301 transmits various types of information to the communication server 101. For example, the transmitting unit 1101 transmits the terminal ID information 802 to the communication server 101 storing the compression parameters 113. Specifically, the terminal ID information 802 is transmitted from the wireless communication unit 306 according to an instruction from the CPU 301 or the DSP 302 depicted in FIG. 3. A download request for the search engine 111 is also transmitted.

The receiving unit 2302 receives, from the communication server 101, the encrypted compression parameters 113A, which are the compression parameters 113 encrypted using the terminal ID information 802. Specifically, the encrypted compression parameters 113A are received from the wireless communication unit 306. If a download request for the compressed file F is made by the mobile communication terminal 103, the compressed file F is also received.

The decrypting unit 2303, using the terminal ID information 802, decrypts the encrypted compression parameters 113A received. The input unit 2305 receives input of an arbitrary search keyword. Specifically, a search keyword is received through user-manipulation of the input keys 307. The searching unit 2306 compares the search keyword and the index data 122 to search for candidate headwords. The search result is displayed on the display screen.

The determining unit 2307 uses the heading data 2100 to identify the compressed file F including the searched headword to determine whether the compressed file F identified is already installed in the mobile communication terminal 103. If it is determined that the file is not installed, an instruction is given to the transmitting unit 2301 to make a download request for the compressed file F. If the compressed file F is received by the receiving unit 2302, the updating unit 2308 updates the installation flag of the compressed file F to the installed flag, i.e., "1".

If the determining unit 2307 determines that the file is installed, the extracting unit 2309 extracts, from compressed dictionary data 2300 already stored in the mobile communication terminal 103, the compressed file F including the searched headword. The decompressing unit 2304 decompresses the compressed file F using the compression parameters 113 decrypted. The reading unit 2311 reads the explanation text of the headword from the decompressed main-body HTML file f. The displaying unit 2312 displays the read explanation text on the display screen.

As a result, a missing part of the compressed file F may be acquired at each search process. If the remaining available capacity of the memory 303 is a predetermined capacity or less, the download or installation of the compressed file F may be terminated.

Specifically, the transmitting unit 2301, the receiving unit 2302, the decrypting unit 2303, the decompressing unit 2304, the input unit 2305, the searching unit 2306, the determining unit 2307, the updating unit 2308, the extracting unit 2309, the reading unit 2311, and the displaying unit 2312 described above are implemented by an execution of programs (stored in the memory 303 depicted in FIG. 3) by the CPU 301 or by the DSP 302, for example.

Figure 24:
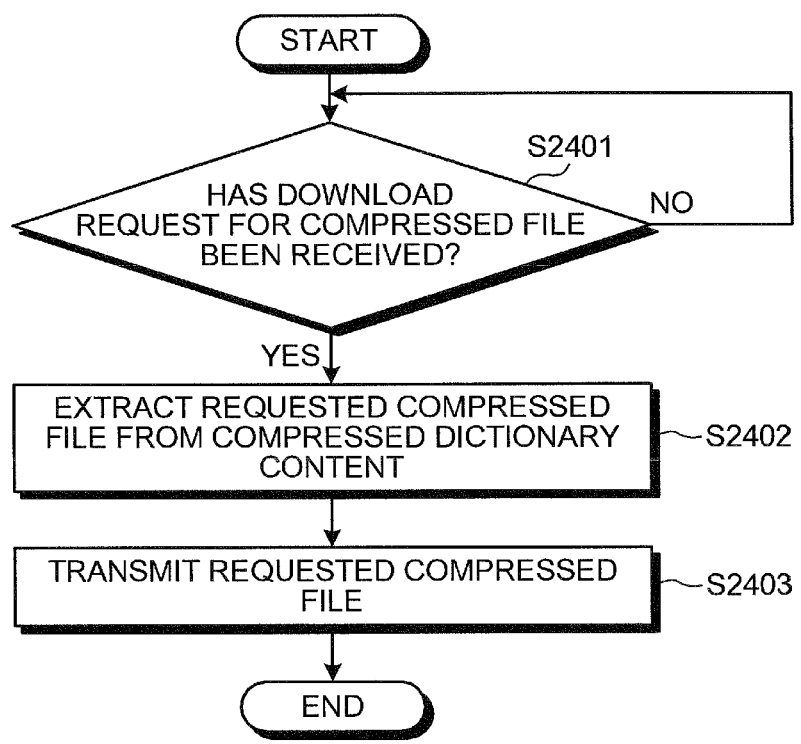
FIG. 24 is a flowchart of the communication process of the communication server according to the third embodiment.

FIG. 24 is a flowchart of the communication process of the communication server 101 according to the third embodiment. As depicted in FIG. 24, the communication server 101 waits until the download request for the compressed file F is received from the mobile communication terminal 103 (step S2401: NO).

When the download request is received (step S2401: YES), the compressed file F requested is extracted from the compressed dictionary content 112A (step S2402). The compressed file F extracted is transmitted to the mobile communication terminal 103 through packet communication (step S2403).

Figure 25:
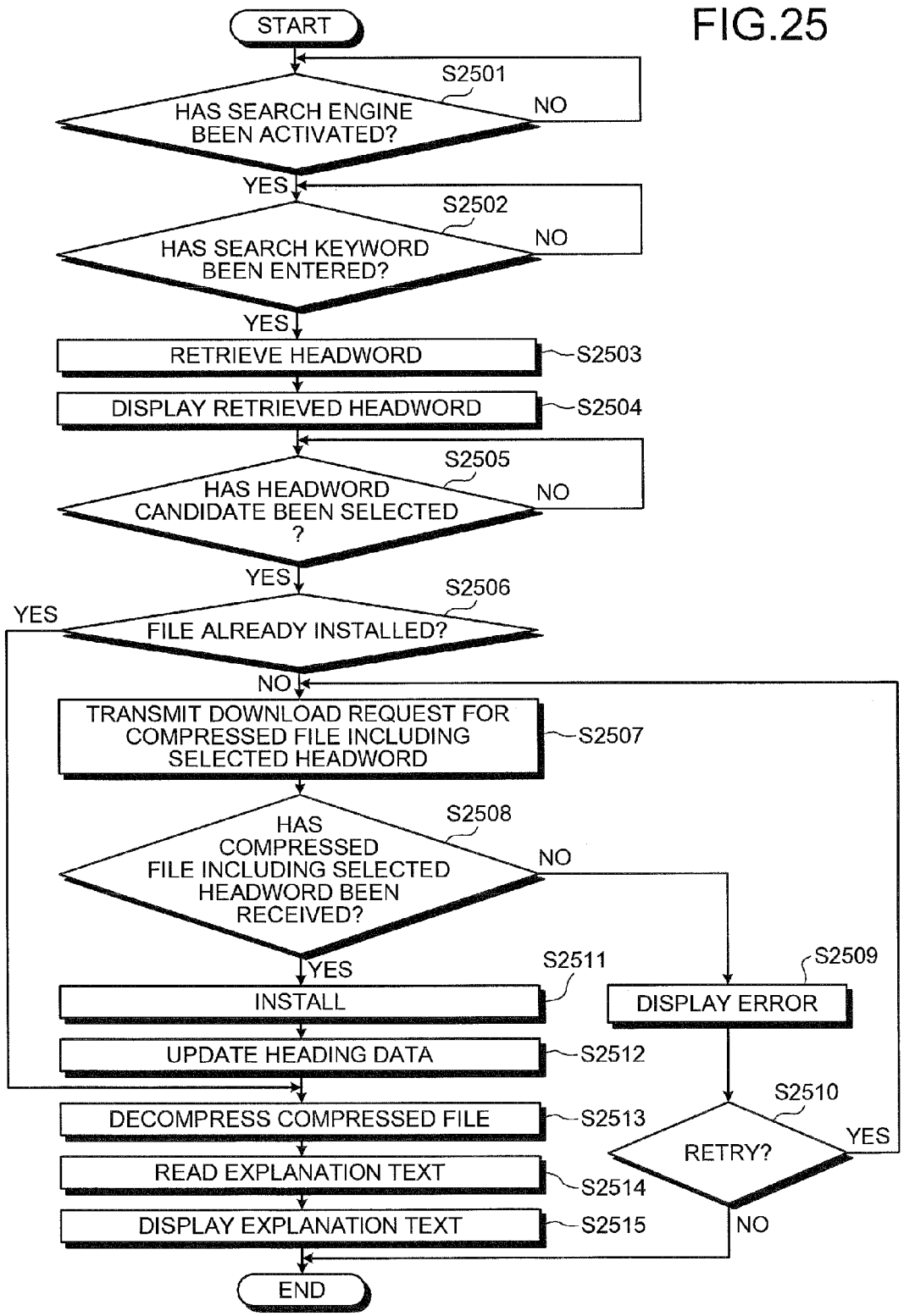
FIG. 25 is a flowchart of the search process of the mobile communication terminal according to the third embodiment.

FIG. 25 is a flowchart of the search process of the mobile communication terminal 103 according to the third embodiment. The communication process of the mobile communication terminal 103 is identical to the flowchart of the communication process of the mobile communication terminal 103 according to the first embodiment and description thereof is omitted. It is assumed that the encrypted compression parameters 113A have already been transmitted to the mobile communication terminal 103 and decrypted with the terminal ID information 802 in the mobile communication terminal 103.

As depicted in FIG. 25, the activation of the search engine 111 is waited for (step S2501: NO), and when the search engine 111 is activated (step S2501: YES), the entry of a search keyword is waited for (step S2502: NO). When a search keyword is entered (step S2502: YES), headwords matching or relevant to the search keyword are retrieved from the index data 122 (step S2503).

For example, in the case of a complete match with the search keyword, the headword may be extracted from the index data 122. Alternatively, in the case of a partial match with the search keyword, headwords relevant to the search keyword may be extracted. The headwords retrieved in this way are referred to as "retrieved headwords".

The retrieved headwords are displayed on the display screen (step S2504) to wait for a user to select a headword (step S2505: NO). If a headword is selected (step S2505: YES), it is determined whether the compressed file F including the selected headword is has already been installed in the mobile communication terminal 103 (step S2506). Specifically, the determination is made by reference to the installation flag of the heading data 2100.

If the file is installed (step S2506: YES), the process goes to step S2513. On the other hand, if the file has not been installed (step S2506: NO), a download request for the compressed file F including the selected headword is transmitted to the communication server 101 (step S2507).

It is determined whether the compressed file F including the selected headword has been received from the communication server 101 through packet communication (step S2508). If the file is not received within a predetermined time (step S2508: NO), an error is displayed on the display screen (step S2509). If no retry is performed (step S2510: NO), a series of the process is terminated. On the other hand, if a retry is performed (step S2510: NO), the process returns to step S2507.

If the compressed file F including the selected headword is received at step S2508 (step S2508: YES), the compressed file F received is installed (step S2511), and the installation flag of the heading data 2100 is updated (step S2512). The compressed file F including the selected headword is decompressed with the compression parameters 113 (step S2513). The explanation text of the selected headword is read from the decompressed main-body HTML file (step S2514) and the explanation text is displayed on the display screen (S2515).

Since the third embodiment of the present invention is an arrangement for downloading only lacking compressed files F, the download time may be reduced and the communication costs may be reduced as compared to downloading the entire dictionary content 112. Since unnecessary compressed files F are not stored, this embodiment may be utilized by the mobile communication terminal 103 equipped with the memory 303 of a small capacity.

As described above, aspects of the embodiments have effects of solving the problems of installation time, installation volume, communication cost, and authentication of large-capacity dictionaries and e-learning content to increase practicality and convenience.

Further, configuration according to the embodiments above may include extraction of a compressed file, encryption of the compressed file using the terminal ID information, and transmission of the compressed file encrypted to the mobile communication terminal. Additionally, configuration may be such that if a compressed file that has been encrypted by terminal ID information is received, the compressed file may be decrypted by the terminal ID information and further decompressed using compression parameters.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of controlling decompression, the method comprising:
    transmitting, by a first computer that already has stored therein compressed data that are compressed based on compression parameters, identification information for identifying the first computer to a second computer that stores therein the compression parameters;
    encrypting, by the second computer, the compression parameters using the identification information received from the first computer, the compression parameters including at least a frequency of appearance and an allocated sign for each piece of character data;
    transmitting, by the second computer, the encrypted compression parameters to the first computer;
    decrypting, by the first computer, the encrypted compression parameters received from the second computer using the identification information; and
    decompressing, by the first computer, the compressed data based on the decrypted compression parameters.

2. The method according to claim 1, further comprising:
generating authentication information by the second computer;
storing, by the second computer, the generated authentication information to a storage unit;
transmitting, by the second computer, the encrypted compression parameters and the authentication information to the first computer;
storing, by the first computer, the received authentication information and the compressed data to a storage medium;
transmitting, by a third computer capable of reading data from the storage medium, the authentication information and other identification information for identifying the third computer to the second computer;
encrypting, by the second computer, the compression parameters using the other identification information when the received authentication information is identical to the authentication information stored in the storage unit; and
transmitting, by the second computer, the compression parameters encrypted using the other identification information to the third computer.

3. The method according to claim 1, further comprising:
storing, by the first computer, correlation data including a keyword correlated to the compressed data;
extracting, by the first computer, compressed data correlated with a search keyword from the correlation data upon receiving the search keyword;
decompressing, by the first computer, the extracted compressed data using the decrypted compression parameters; and
reading and outputting information concerning the search keyword for the decompressed data.

4. The method according to claim 3, wherein the correlation data include information indicating whether the compression data have been already downloaded to the first computer, and
the method further includes downloading, by the first computer, the extracted compression data from the second computer when the extracted compression data have not been downloaded at the time of extracting the compression data correlated with the search keyword from the correlation data.

5. A non-transitory computer-readable recording medium storing therein a communication program that, when executed, causes a first computer to perform the steps of:
transmitting identification information for identifying the first computer, that already has stored therein compressed data, to a second computer that stores therein compression parameters;
receiving encrypted compression parameters from the second computer, the encrypted compression parameters being encrypted using the identification information for identifying the first computer and including at least a frequency of appearance and an allocated sign for each piece of character data;
decrypting the encrypted compression parameters received from the second computer using the identification information; and
decompressing the compressed data based on the decrypted compression parameters.

6. The non-transitory computer-readable recording medium of claim 5, further causing the first computer to perform the steps of:
storing correlation data including a keyword correlated to the compressed data;
extracting compressed data correlated with a search keyword from the correlation data upon receiving the search keyword;
decompressing the extracted compressed data using the decrypted compression parameters; and
reading and outputting information concerning the search keyword for the decompressed data.

7. A non-transitory computer-readable recording medium storing therein a communication program that, when executed, causes a computer to perform the steps of:
storing one or more compression parameters in a memory;
receiving identification information for identifying another computer that already has stored therein compressed data that are compressed based on compression parameters;
encrypting the compression parameters using the received identification information, the compression parameters including at least a frequency of appearance and an allocated sign for each piece of character data; and
transmitting the encrypted compression parameters to the another computer.

8. The non-transitory computer-readable recording medium of claim 7, further causing the computer to perform the steps of:
generating authentication information;
storing the generated authentication information to a storage unit;
transmitting the authentication information to the another computer;
receiving the authentication information and other identification information for identifying a third computer;
encrypting the compression parameters using the other identification information when the received authentication information is identical to the authentication information stored in the storage unit; and
transmitting the compression parameters encrypted using the other identification information to the third computer.

9. An apparatus comprising:
a memory that already has stored therein compressed data; and
a processor that executes a program including a procedure, the procedure comprising:
transmitting identification information for identifying the apparatus to another apparatus that stores therein compression parameters;
receiving encrypted compression parameters from the another apparatus in response to the transmitting of the identification information, the encrypted compression parameters being encrypted using the identification information for identifying the apparatus and including at least a frequency of appearance and an allocated sign for each piece of character data and being encrypted compression parameters using the identification information in the another apparatus;
decrypting the encrypted compression parameters received at the receiving using the identification information; and
decompressing the compressed data based on decrypted compression parameters decrypted at the decrypting.

10. The apparatus according to claim 9, wherein the memory stores correlation data including a keyword correlated to the compressed data, the procedure further comprises:
extracting compressed data correlated with a search keyword from the correlation data upon receiving the search keyword, decompressing the extracted compressed data extracted at the extracting using the decrypted compression parameters, and reading and outputting information concerning the search keyword for the decompressed data.

* * * * *